US008960719B2

(12) United States Patent
Iida et al.

(10) Patent No.: US 8,960,719 B2
(45) Date of Patent: Feb. 24, 2015

(54) AIRBAG APPARATUS

(71) Applicant: Toyoda Gosei Co., Ltd., Kiyosu-shi, Aichi-ken (JP)

(72) Inventors: Takashi Iida, Kiyosu (JP); Norihisa Taya, Kiyosu (JP); Eiji Sato, Kiyosu (JP); Takayoshi Mizuno, Kiyosu (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 0 days.

(21) Appl. No.: 14/203,916

(22) Filed: Mar. 11, 2014

(65) Prior Publication Data

US 2014/0265277 A1  Sep. 18, 2014

(30) Foreign Application Priority Data

Mar. 18, 2013 (JP) .................. 2013-054991
Nov. 18, 2013 (JP) .................. 2013-238095

(51) Int. Cl.
*B60R 21/239* (2006.01)
*B60R 21/16* (2006.01)
*B60R 21/231* (2011.01)

(52) U.S. Cl.
CPC ............. *B60R 21/164* (2013.01); *B60R 21/231* (2013.01)
USPC ...................... 280/739; 280/743.1; 280/730.2

(58) Field of Classification Search
CPC ............ B60R 21/239; B60R 21/23138; B60R 2021/23538; B60R 2021/23576

USPC .................... 280/743.1, 739, 730.2
See application file for complete search history.

(56) References Cited

U.S. PATENT DOCUMENTS

| 5,536,038 A * | 7/1996 | Bollaert et al. ............ 280/730.2 |
| 7,900,957 B2 * | 3/2011 | Honda .......................... 280/729 |
| 8,550,495 B2 * | 10/2013 | Sato et al. .................. 280/730.2 |
| 2014/0300089 A1 * | 10/2014 | Azuma et al. .............. 280/730.2 |

FOREIGN PATENT DOCUMENTS

| JP | H09-011845 A | 1/1997 |
| JP | 2011-168234 A | 9/2011 |

* cited by examiner

*Primary Examiner* — Ruth Ilan
(74) *Attorney, Agent, or Firm* — Posz Law Group, PLC

(57) ABSTRACT

An airbag apparatus has an airbag formed by sewing fabric portions together at peripheries thereof. A periphery sewn portion of the airbag has two terminals separated from each other. The terminals are formed by leaving sections of the peripheries of the fabric portions unsewn. A surrounding sewn portion is formed about each terminal of the periphery sewn portion. The airbag has a vent hole between the terminals. The opening of the vent hole is defined by vent hole defining sections, each of which is in one of the surrounding sewn portions. Position determining portions are provided in the margin of the airbag. Each surrounding sewn portion is formed in place with reference to the corresponding position determining portion. Each position determining portion is located father from the vent hole in the circumferential direction of the margin than the vent hole defining section of the corresponding surrounding sewn portion.

11 Claims, 11 Drawing Sheets

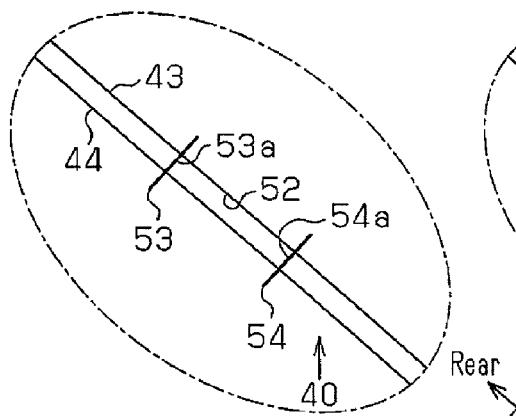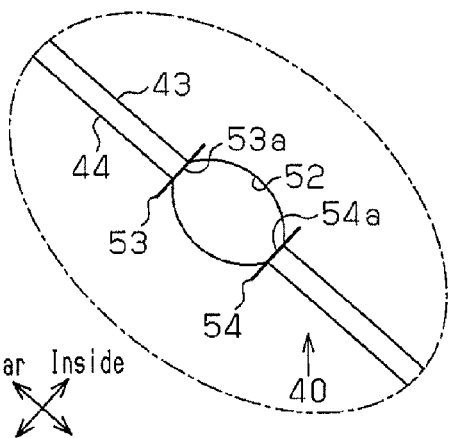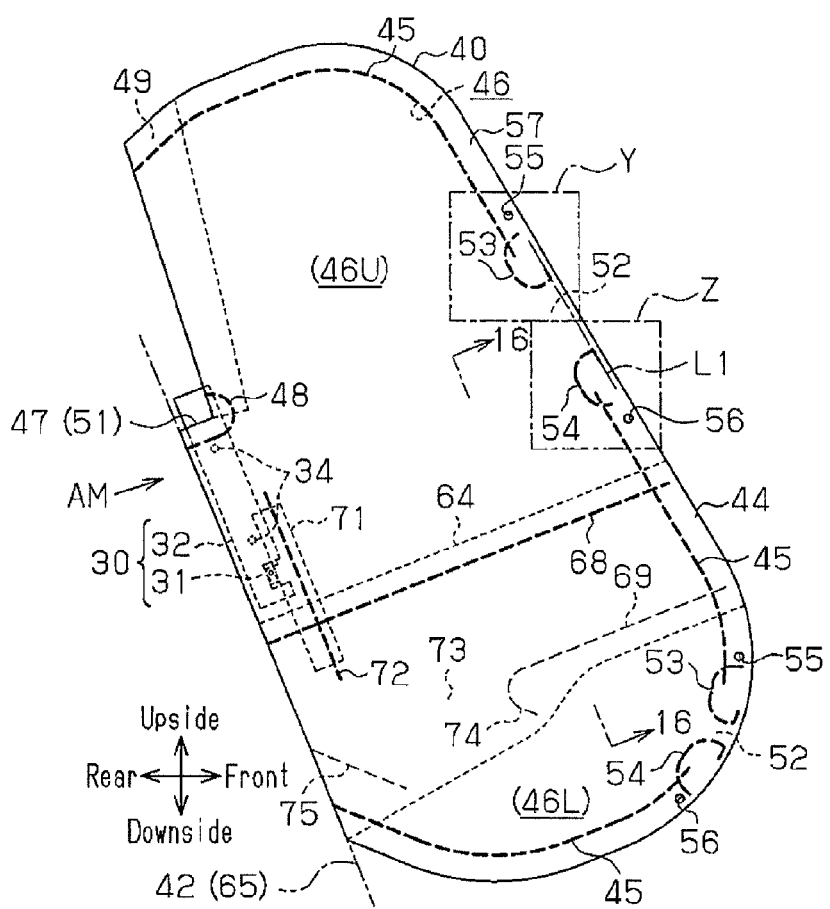

AIRBAG APPARATUS

BACKGROUND OF THE INVENTION

The present invention relates to an airbag apparatus that inflates an airbag to protect an occupant from an impact that is applied to, for example, a vehicle.

An air bag apparatus is effective for protecting an occupant when an impact is applied to transportation such as a vehicle. One example of an airbag apparatus is disclosed in Japanese Laid-Open Patent Publication No. 2011-168234.

The airbag apparatus includes an airbag 104, which is formed by sewing fabric portions 101 together at peripheries thereof. The airbag 104 has a periphery sewn portion 102, which is formed by the sewing, and an inflation portion 103 surrounded by the periphery sewn portion 102. The periphery sewn portion 102 has two terminals 102a, 102b, which are separated from each other. The terminals 102a, 102b are formed by leaving sections of the peripheries of the fabric portions 101 unsewn. The airbag 104 further has two circular second sewn portions 105. Each second sewn portion 105 is located closer to the center of the inflation portion 103 than the corresponding terminal 102a, 102b of the periphery sewn portion 102, and, at that position, sews the fabric portions 101 to each other. Parts of the second sewn portions 105 that face each other and are closest to each other serve as vent hole defining sections 105a, which define an opening 106a of a vent hole 106.

When the transportation receives an impact, inflation gas G from an inflator 107 is supplied to the interior of the inflation portion 103, so that the airbag 104 is deployed and inflated. The deployed and inflated airbag 104 is located between an occupant and a transportation component that bulges into the transportation, for example, a side door, to restrain the occupant. The excess of the inflation gas G in the inflation portion 103 of the deployed and inflated airbag 104 is discharged to the outside of the inflation portion 103 through the vent hole 106 as indicated by an arrow in FIG. 20. Such restraint of the occupant by the airbag 104 and the drop of the internal pressure of the airbag 104 due to discharge of the inflation gas G through the vent hole 106 reduce the impact transmitted to the occupant via, for example, the side door.

When inflation gas is discharged through the vent hole 106, the second sewn portions 105 prevent the stress of the inflation gas from being concentrated on the terminals 102a, 102b of the periphery sewn portion 102.

SUMMARY OF THE INVENTION

In the above described airbag apparatus, since the vent hole defining sections 105a of the second sewn portions 105 significantly influence the discharge capability of the vent hole 106, the second sewn portions 105, which include the vent hole defining sections 105a, need to be formed with accuracy. However, Japanese Laid-Open Patent Publication No. 2011-168234 discloses no means for forming the second sewn portions 105 with accuracy, and it is unclear how the vent hole defining sections 105a, that is, the opening 106a of the vent hole 106, can be formed at the desired position with accuracy.

Accordingly, it is an objective of the present invention to provide an airbag apparatus that allows the opening of a vent hole of an airbag to be formed with accuracy.

To achieve the foregoing objective and in accordance with one aspect of the present invention, an airbag apparatus including an airbag is provided. The airbag is formed into a bag shape by sewing a plurality of fabric portions together at peripheries thereof. The airbag includes a periphery sewn portion formed by the sewing, a margin located outward of the periphery sewn portion, and an inflation portion surrounded by the periphery sewn portion. The inflation portion is adapted to be inflated by being supplied with inflation gas and has a center. The periphery sewn portion has two terminals separated from each other. The terminals are formed by leaving sections of the peripheries of the fabric portions unsewn. The airbag further includes a pair of surrounding sewn portions, a vent hole, and a pair of position determining portions. Each of the surrounding sewn portions is formed by sewing parts of the fabric portions that surround one of the terminals of the periphery sewn portion. The vent hole is located between the terminals of the periphery sewn portion, and has an opening that allows inflation gas from inside the inflation portion to be discharged. The opening is defined by vent hole defining sections, each of which is located in one of the surrounding sewn portions. The vent hole defines sections facing each other and being closest to each other. Each of the position determining portions is located close to one of the surrounding sewn portions. Each of the surrounding sewn portions is formed in place with reference to the corresponding position determining portion. The position determining portions are each formed in the margin and farther away from the vent hole in a circumferential direction of the margin than the vent hole defining section of the corresponding surrounding sewn portion.

Other aspects and advantages of the invention will become apparent from the following description, taken in conjunction with the accompanying drawings, illustrating by way of example the principles of the invention.

BRIEF DESCRIPTION OF THE DRAWINGS

FIG. 10(a) is a partial front view as viewed in the direction of arrow A in FIG. 3, illustrating a vent hole in a closed state;

FIG. 10(b) is a partial front view as viewed in the direction of arrow A in FIG. 3, illustrating a vent hole in an open state;

FIG. 11 is a side view of a second embodiment of the present invention, illustrating an airbag module in a state where an airbag is in an uninflated and deployed state;

DETAILED DESCRIPTION OF THE PREFERRED EMBODIMENTS

First Embodiment

A side airbag apparatus for a vehicle according to a first embodiment of the present invention will now be described with reference to FIGS. 1 to 10(b). In the following, the traveling direction of the vehicle is defined as a forward direction. The backward, upward, downward, leftward, and rightward directions are defined with reference to the forward direction. In each of the drawings, "front" represents the front side of the vehicle, "rear" represents the rear side of the vehicle, "inside" represents inner side of the vehicle, and "outside" represents the outer side of the vehicle. The inner side of the vehicle refers to a part closer to the center of the vehicle in the widthwise direction, and the outer side of the vehicle refers to a part separated from the center or the vehicle in the widthwise direction.

Figure 1:
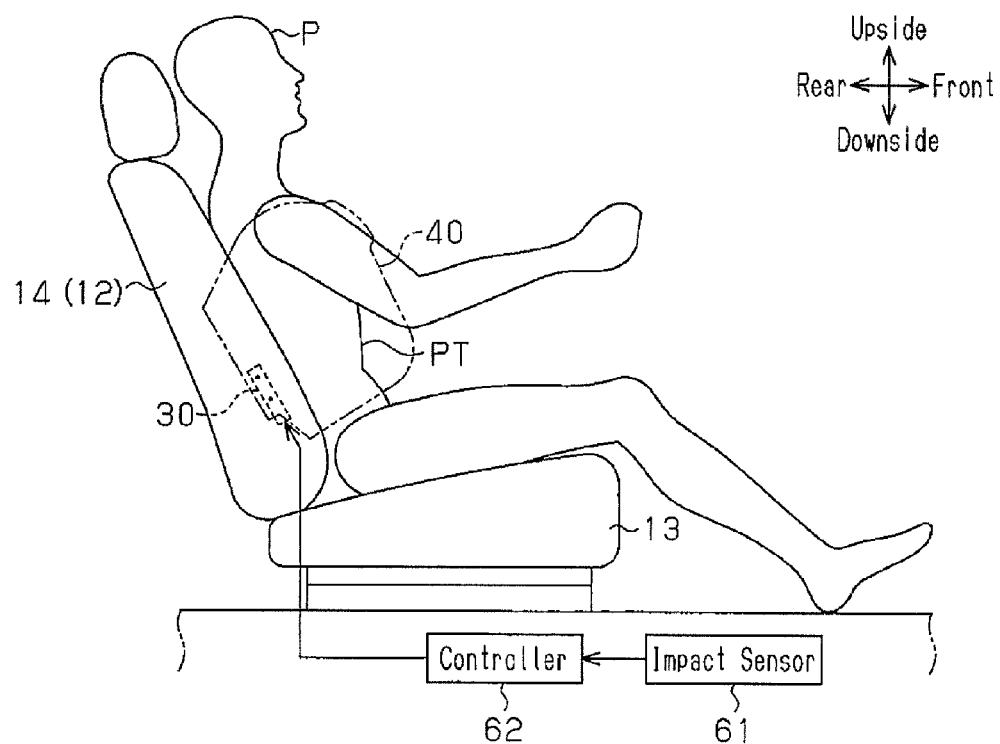
FIG. 1 is a side view illustrating, together with an occupant, a vehicle seat to which a side airbag apparatus for a vehicle according to a first embodiment of the present invention is mounted.
Figure 2:
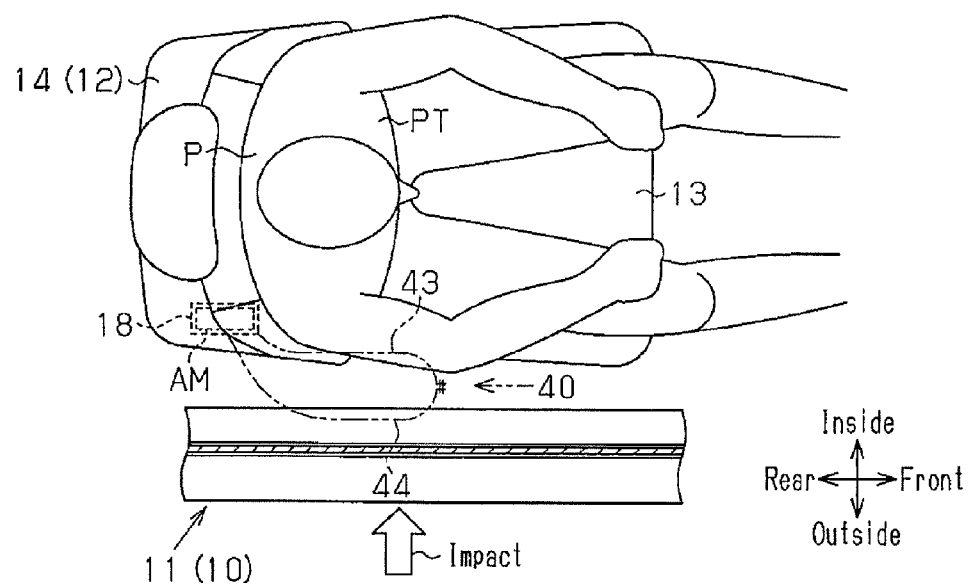
FIG. 2 is a schematic cross-sectional plan view of the first embodiment, illustrating, together with an occupant, the positional relationship of the vehicle seat and a body side portion of the vehicle.

As shown in FIGS. 1 and 2, a transportation seat, which is a vehicle seat 12 in this embodiment, is arranged on the inner side of a body side portion 11 of a vehicle 10. It is provided that an average sized occupant (adult) is seated in the vehicle seat 12 in a predetermined adequate posture. The body side portion 11 refers to a vehicle component that is located at a side of the vehicle 10, and mainly corresponds to a door and a pillar. For example, part of the body side portion 11 that corresponds to the front seat includes a front door and a center pillar (B-pillar). Part of the body side portion 11 that corresponds to the rear seat includes a rear part of the side door (rear door), a C-pillar, a front part of a wheel well, and a rear quarter.

The vehicle seat 12 includes a seat cushion 13 and a seat back 14. The seat back 14 extends upward from the rear end of the seat cushion 13, and the inclination angle can be adjusted by a tilt adjusting mechanism (not shown). The vehicle seat 12 is arranged in the vehicle 10 such that the seat back 14 faces forward of the vehicle. The widthwise direction of the thus arranged vehicle seat 12 matches with the direction of the vehicle width.

Figure 4A:
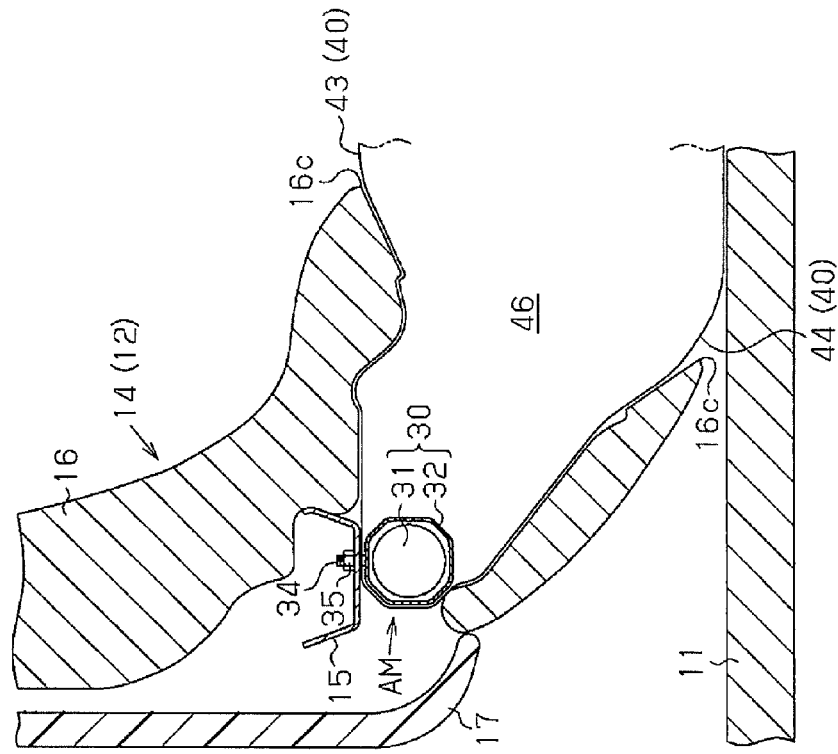
FIG. 4(a) is a partial cross-sectional plan view of the first embodiment, illustrating the airbag module installed in a seat back.
Figure 4B:
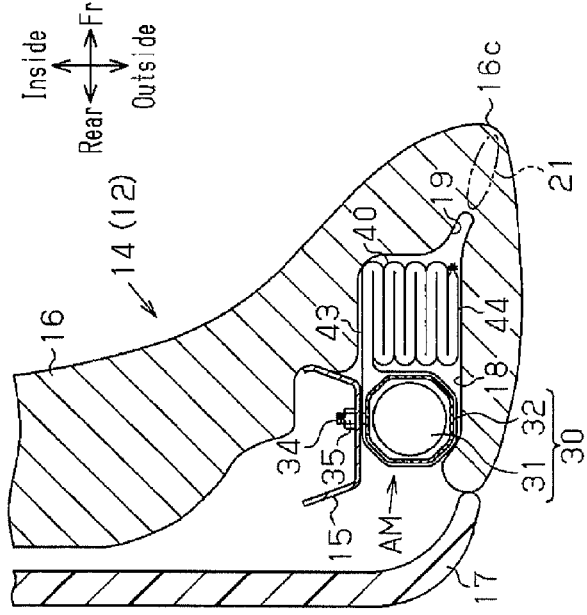
FIG. 4(b) is a partial cross-sectional plan view of the first embodiment, illustrating a state in which the airbag has been projected from the vehicle seat to be deployed and inflated with a part remaining in the seat back.

A seat frame, which forms a framework of the seat back 14, is incorporated in the seat back 14. As shown in FIG. 4(a), a part of the seat frame is located in the outer part of the seat back 14. The part of the seat frame (hereinafter referred to as a side frame portion 15) is formed by bending a metal plate. A seat pad 16, which is made of an elastic material such as urethane foam, is provided on the front side of the seat frame, which includes the side frame portion 15. Also, a hard back board 17, which is formed, for example, of plastic, is arranged on the back of the seat frame. Although the seat pad 16 is coated with a cover, the cover is not illustrated in FIG. 4(a). The same applies to FIG. 4(b), which will be discussed below.

In the seat pad 16, a storage portion 18 is provided in the vicinity of the outer side of the side frame portion 15. The storage portion 18 is located in the vicinity of and diagonally backward of an occupant P seated on the vehicle seat 12 (see FIG. 2). The storage portion 18 accommodates an airbag module AM, which forms a main part of the side impact airbag apparatus.

A slit 19 is formed to extend from the outer front corner of the storage portion 18. The slit 19 extends diagonally forward and toward the exterior. A section between a front corner 16c of the seat pad 16 and the slit 19 (a part surrounded by a line formed by a long dash alternating with two short dashes in FIG. 4(a)) forms a breakable portion 21, which is designed to be broken by an airbag 40, which will be described below.

The airbag module AM includes as its main components an inflator assembly 30 and the airbag 40. Each of these components will now be described.

<Inflator Assembly 30>

Figure 3:
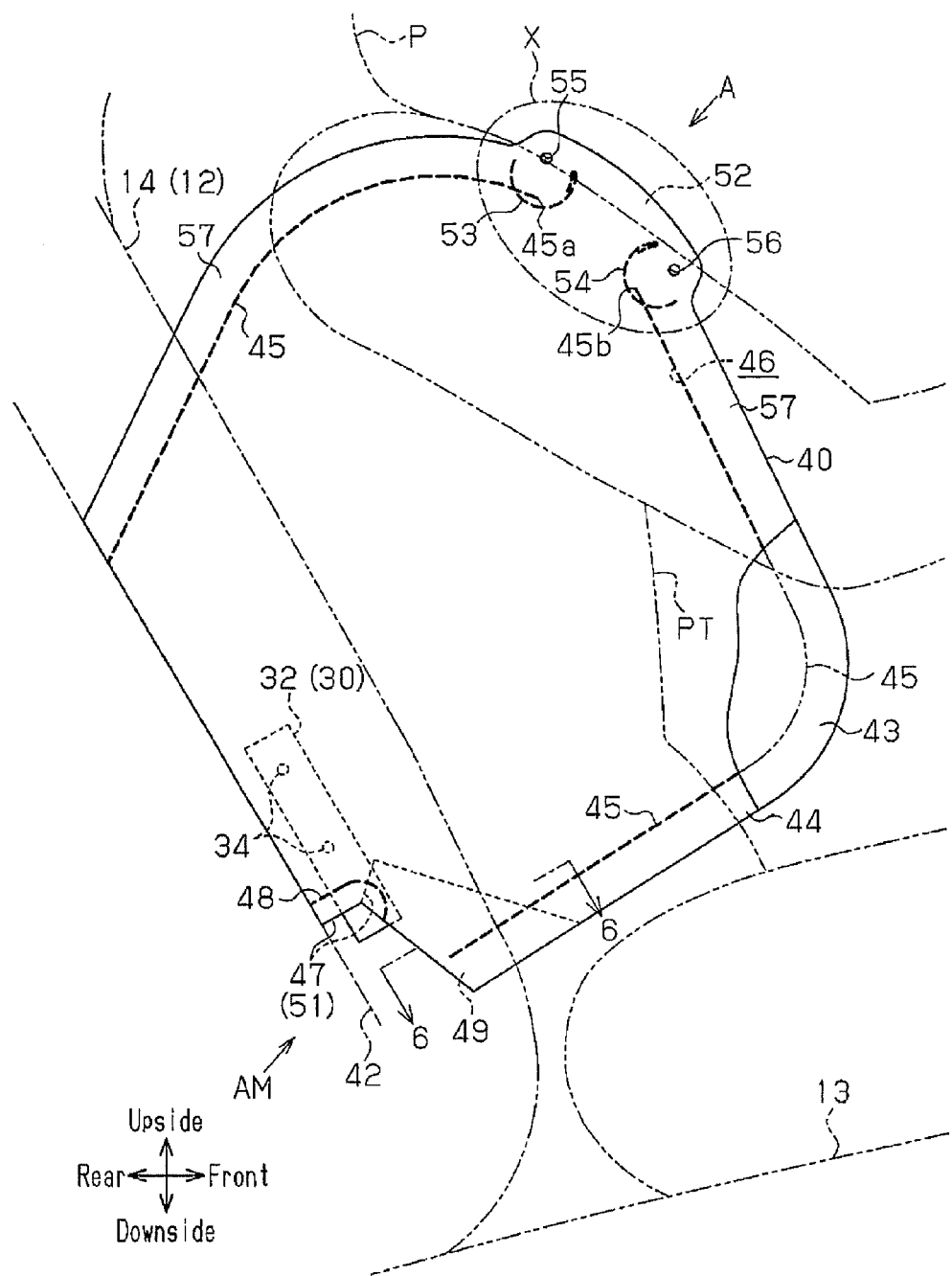
FIG. 3 is a side view of the first embodiment, schematically illustrating, together with an occupant and a vehicle seat, an airbag module of which the airbag is in an uninflated and deployed state.

As shown in FIGS. 3 and 4(a), the inflator assembly 30 includes a gas generator, which is an inflator 31, and a retainer 32, which surrounds the inflator 31. In the first embodiment, a pyrotechnic type inflator is employed as the inflator 31. The inflator 31 is substantially columnar and accommodates a gas generating agent (not shown), which generates inflation gas. A harness (not shown), which is wiring for applying activation signals to the inflator 31, is connected to one end in the longitudinal direction (the lower end in the first embodiment) of the inflator 31.

In place of the pyrotechnic type inflator using the gas generating agent, it is possible to use a hybrid type inflator, which ejects inflation gas by breaking a partition wall of a high-pressure gas cylinder filled with high-pressure gas with a low explosive.

The retainer 32 functions as a diffuser for controlling the direction of discharged inflation gas and also serves to fasten the inflator 31, together with the airbag 40, to the side frame portion 15. Most of the retainer 32 is formed by bending a plate such as a metal plate into a cylindrical shape that extends substantially in the up-down direction. The retainer 32 has a window (not shown), through which a considerable amount of inflation gas discharged by the inflator 31 is ejected to the exterior of the retainer 32.

Bolts 34 are fixed to the retainer 32. The bolts 34 serve as securing members for attaching the retainer 32 to the side frame portion 15.

The inflator 31 and the retainer 32 of the inflator assembly 30 may be integrated.

<Airbag 40>

If an impact is applied to the body side portion 11 of the vehicle 10 due to a side collision or the like when the vehicle 10 is, for example, travelling, the inflator 31 supplies inflation gas to the airbag 40. The airbag 40 is then projected forward from the seat back 14 with a part of the airbag 40 remaining in the seat back 14.

FIG. 3 shows the airbag module AM, together with the occupant P and the vehicle seat 12, in a state in which the airbag 40 is flatly deployed without being supplied with inflation gas (hereinafter, referred to as an uninflated and deployed state).

As shown in FIGS. 3 and 4(a), the airbag 40 is formed by folding a single fabric piece (also referred to as a base fabric, or a fabric panel) along a folding line 42 set at the center portion to be overlapped in the vehicle widthwise direction, and joining the overlapped portion into a bag shape. In the present embodiment, to distinguish the two overlapped portions of the airbag 40, the part located on the inner side is referred to as a fabric portion 43, and the part located on the outer side is referred to as a fabric portion 44. In FIG. 3, part of the fabric portion 44 is illustrated in a cut away state to show the fabric portion 43.

In the first embodiment, the fabric piece is folded in half such that the folding line 42 is located at the rear end of the airbag 40. However, the fabric piece may be folded in half such that the folding line 42 is located at another end such as the front end, the upper end, or the lower end. The airbag 40 may also be formed of two fabric pieces divided along the folding line 42. In this case, the airbag 40 is formed by overlapping the two fabric pieces in the vehicle widthwise direction, and joining the fabric pieces into a bag shape. Furthermore, the airbag 40 may be formed of three or more fabric pieces.

The outer shapes of the fabric portions 43, 44 of the airbag 40 are symmetric with respect to the folding line 42. The shape and size of the fabric portions 43, 44 are set to be able to occupy the region corresponding to the thorax PT of the occupant P seated on the vehicle seat 12 when the airbag 40 is deployed and inflated between the vehicle seat 12 and the body side portion 11.

The fabric portions 43, 44 are preferably formed of a material having high strength and flexibility to be easily folded. The material may be, for example, woven cloth formed of polyester threads or polyamide threads.

The above described joining of the fabric portions 43, 44 is achieved by a periphery sewn portion 45 provided in the peripheries of the fabric portions 43, 44. In the first embodiment, most of the periphery sewn portion 45 is formed by sewing the peripheries of the fabric portions 43, 44 together except for a rear end part in the vicinity of the folding line 42.

In FIG. 3, the periphery sewn portion 45 is indicated by a thick broken line in a region in which the outer side fabric portion 44 is not cut away. This also applies to a reinforcement loop portion 48 and surrounding sewn portions 53, 54, which will be discussed below. The periphery sewn portion 45 is shown by a line formed by a long dash alternating with two short dashes at a part where the fabric portions 44 is cut away and the inner side fabric portion 43 is exposed.

A space between the fabric portions 43, 44 and surrounded by the periphery sewn portion 45 functions as an inflation portion 46, which is inflated by inflation gas.

Figure 5:
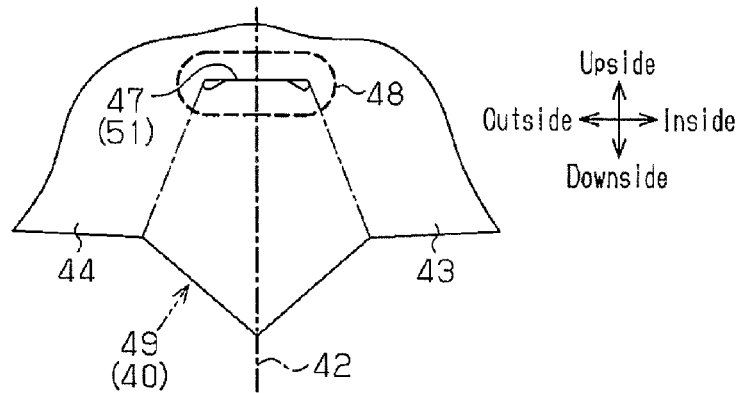
FIG. 5 is a partially developed view of the first embodiment, illustrating a part of the deployed airbag (a part at which an inward folding portion is to be formed)

FIG. 5 shows a state in the process of forming the airbag 40. More specifically, FIG. 5 shows a fabric piece before being folded in half along the folding line 42. That is, FIG. 5 shows part (lower parts) of the fabric portions 43, 44 in a developed state.

Figure 6:
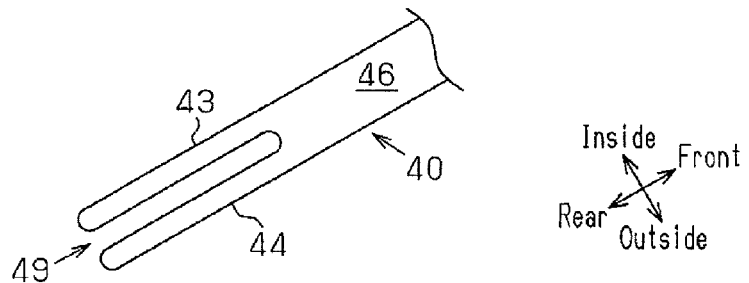
FIG. 6 is a cross-sectional view taken along line 6-6 in FIG. 3.

As shown in FIGS. 3, 5, and 6, a slit 47, which extends orthogonally with respect to the folding line 42, is formed in a lower part of the fabric portions 43, 44. The fabric portions 43, 44 also have a reinforcement loop portion 48 about the slit 47. The reinforcement loop portion 48 is formed by sewing the part about the slit 47 in the fabric portions 43, 44 to reinforce the part surrounding the slit 47.

A part of the fabric portions 43, 44 below the slit 47 forms an inward folding portion 49, which is tucked inward of the remaining parts when the fabric piece is folded in half. The lower end of the inward folding portion 49 is sewn to the remaining parts of the fabric portions 43, 44 by the above described periphery sewn portion 45. When the inward folding portion 49 is formed, the slit 47 is opened to form an insertion port 51 for the inflator assembly 30.

A reinforcing fabric sheet may be provided in the airbag 40 to protect the airbag 40 and others from the heat and pressure of inflation gas.

Figure 7:
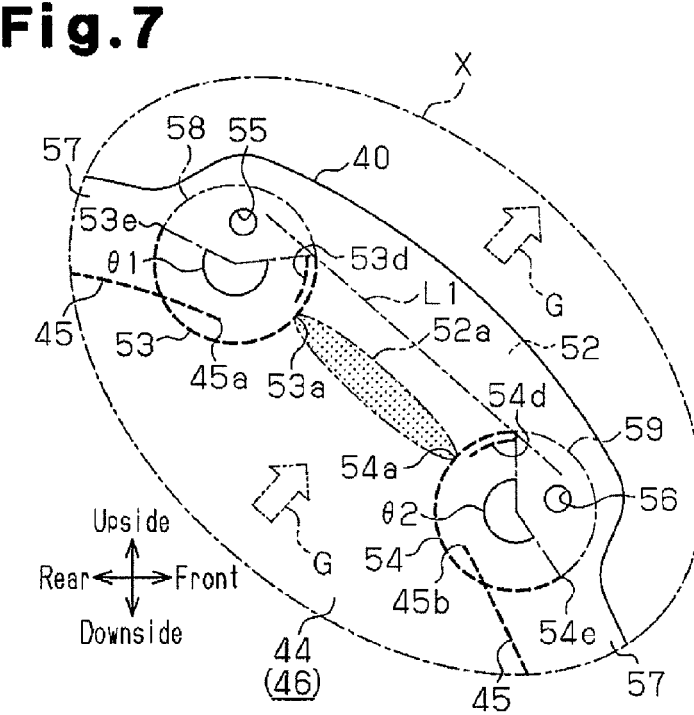
FIG. 7 is an enlarged partial side view illustrating region X of FIG. 3.

As shown in FIGS. 3 and 7, the periphery sewn portion 45 has a pair of terminals 45a, 45b, which is formed by leaving sections of the peripheries of the fabric portions 43, 44 unsewn. The terminals 45a, 45b are separated from each other substantially in the vertical direction at a front upper part of the fabric portions 43, 44. A vent hole 52 is formed in a region between the fabric portions 43, 44 and between the terminals 45a, 45b. The vent hole 52 is used for discharging excess of inflation gas G in the inflation portion 46.

The airbag 40 has the surrounding sewn portions 53, 54. The surrounding sewn portion 53 is formed by sewing parts of the fabric portions 43, 44 that surround the terminal 45a of the periphery sewn portion 45, and the surrounding sewn portion 54 is formed by sewing parts of the fabric portions 43, 44 that surround the terminal 45b of the periphery sewn portion 45. A part of the surrounding sewn portion 53 that is closest to and faces the surrounding sewn portion 54 functions as a vent hole defining section 53a, which forms a part of an opening 52a of the vent hole 52. A part of the surrounding sewn portion 54 that is closest to and faces the surrounding sewn portion 53 functions as a vent hole defining section 54a, which forms a part of the opening 52a of the vent hole 52. In other words, a part between the fabric portions 43, 44 and also between the vent hole defining sections 53a, 54a is the opening 52a of the vent hole 52.

Figure 8:
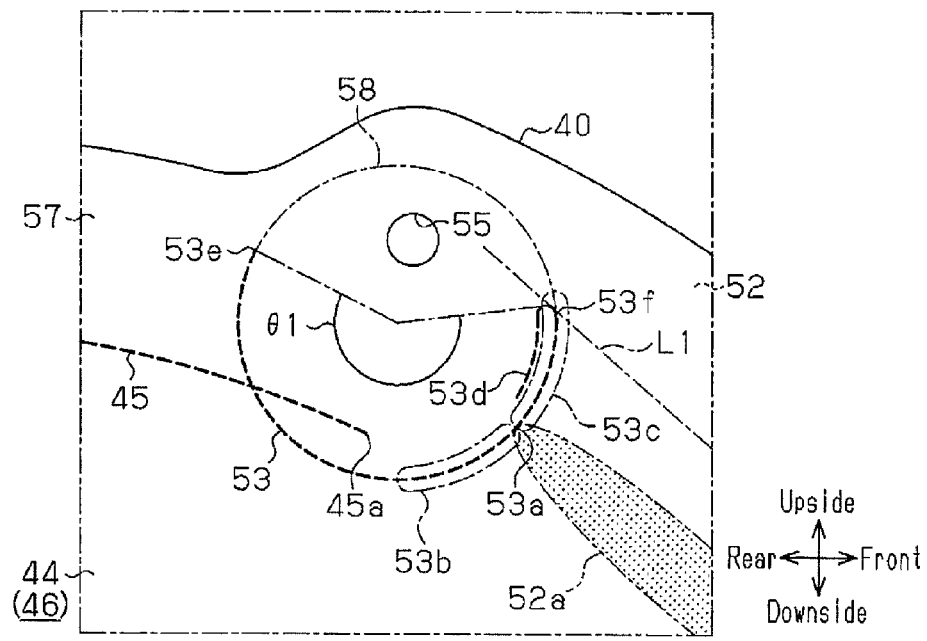
FIG. 8 is an enlarged partial side view illustrating a part of FIG. 7.

As shown in FIG. 8, the surrounding sewn portion 53 has a small-radius arcuate shape the central angle $\theta 1$ of which is greater than 180°, and has a pair of separated terminals 53e, 53f. The open part of the surrounding sewn portion 53 defined by the terminals 53e, 53f faces in the direction opposite from the center of the inflation portion 46. Therefore, a section 53b of the surrounding sewn portion 53 that extends from the vent hole defining section 53a toward the center of the inflation portion 46 has a smooth curved shape. More specifically, the inner curved section 53b of the surrounding sewn portion 53 has an arcuate shape that curves at a constant radius of curvature to be gradually separated from the surrounding sewn portion 54 as the distance from the center of the inflation portion 46 decreases. Further, a section 53c of the surrounding sewn portion 53 that extends from the vent hole defining section 53a and away from the center of the inflation portion 46 has a smooth curved shape. More specifically, the outer curved section 53c of the surrounding sewn portion 53 has an arcuate shape that curves at a constant radius of curvature (the same radius of curvature of the inner curved section 53b) to be gradually separated from the surrounding sewn portion 54 as the distance from the center of the inflation portion 46 increases.

The terminal 53f of the surrounding sewn portion 53, which is close to the vent hole 52, has an auxiliary sewn section 53d, which extends from the terminal 53f in a direction away from the vent hole 52. The auxiliary sewn section 53d is closer to the center of the inflation portion 46 than a straight line L1, which connects the terminal 53f of the surrounding sewn portion 53 and a terminal 54f of the surrounding sewn portion 54, which will be discussed below. In the first embodiment, the auxiliary sewn section 53d is a reversed section that extends toward the vent hole defining section 53a of the surrounding sewn portion 53 by being arranged in an area surrounded by the surrounding sewn portion 53. The auxiliary sewn section 53d is located at a position close to the surrounding sewn portion 53 and is curved along the surrounding sewn portion 53. The terminal 53f of the surrounding sewn portion 53, at which the auxiliary sewn section 53d is reversed, is arranged in a margin 57 of the airbag 40, which is located outward of the periphery sewn portion 45. The terminal 53f is also located between the terminals 45a, 45b of the periphery sewn portion 45. The terminal 53e of the surrounding sewn portion 53, which is located far from the vent hole 52, is formed in the margin 57, and is farther from the vent hole 52 than the terminal 45a of the periphery sewn portion 45.

Figure 9:
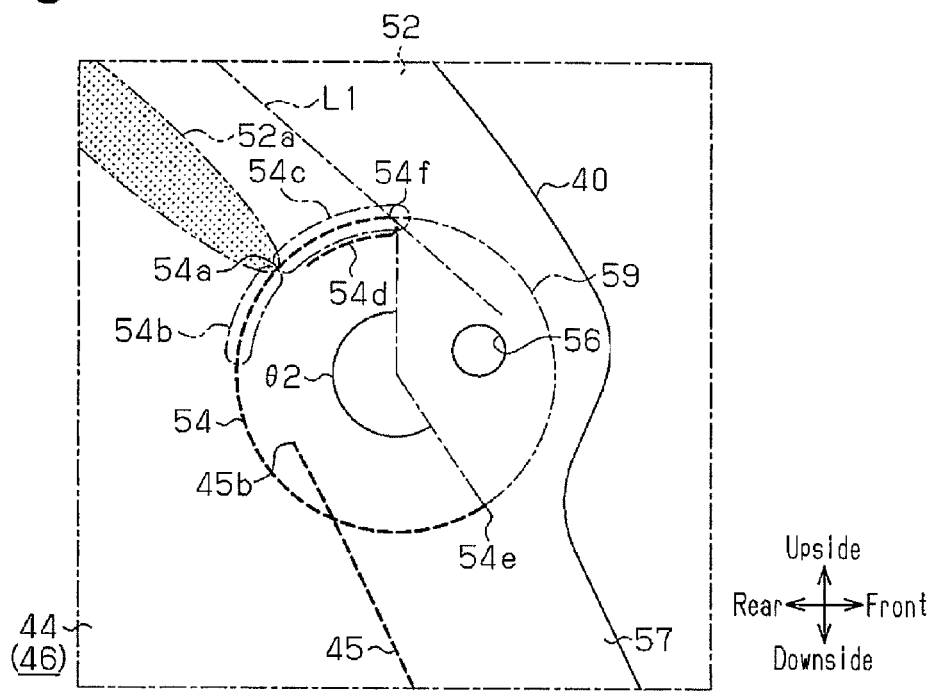
FIG. 9 is another partial side view illustrating a part of FIG. 7.

As shown in FIG. 9, the surrounding sewn portion 54 has a small-radius arcuate shape the central angle θ2 of which is greater than 180°, and has a pair of separated terminals 54e, 54f. The open part of the surrounding sewn portion 54 defined by the terminals 54e, 54f faces in the direction opposite from the center of the inflation portion 46. Therefore, a section 54b of the surrounding sewn portion 54 that extends from the vent hole defining section 54a toward the center of the inflation portion 46 has a smooth curved shape. More specifically, the inner curved section 54b of the surrounding sewn portion 54 has an arcuate shape that curves at a constant radius of curvature to be gradually separated from the surrounding sewn portion 53 as the distance from the center of the inflation portion 46 decreases. Further, a section 54c of the surrounding sewn portion 54 that extends from the vent hole defining section 54a and away from the center of the inflation portion 46 has a smooth curved shape. More specifically, the outer curved section 54c of the surrounding sewn portion 54 has an arcuate shape that curves at a constant radius of curvature (the same radius of curvature of the inner curved section 54b) to be gradually separated from the surrounding sewn portion 53 as the distance from the center of the inflation portion 46 increases.

The terminal 54f of the surrounding sewn portion 54, which is close to the vent hole 52, has an auxiliary sewn section 54d, which extends from the terminal 54f in a direction away from the vent hole 52. The auxiliary sewn section 54d is closer to the center of the inflation portion 46 than the straight line L1. In the first embodiment, the auxiliary sewn section 54d is a reversed section that extends toward the vent hole defining section 54a of the surrounding sewn portion 54 by being arranged in an area surrounded by the surrounding sewn portion 54. The auxiliary sewn section 54d is located at a position close to the surrounding sewn portion 54 and is curved along the surrounding sewn portion 54. The terminal 54f of the surrounding sewn portion 54, at which the auxiliary sewn section 54d is reversed, is arranged in the margin 57, and is located between the terminals 45a, 45b of the periphery sewn portion 45. The terminal 54e of the surrounding sewn portion 54, which is located far from the vent hole 52, is formed in the margin 57, and is farther from the vent hole 52 than the terminal 45b of the periphery sewn portion 45.

As shown in FIG. 7, the fabric portions 43, 44 have position determining portions 55, 56. The position determining portion 55 is used as a reference for determining the position to form the surrounding sewn portion 53 when the surrounding sewn portion 53 is formed, and the position determining portion 56 is used for determining the position to form the surrounding sewn portion 54 when the surrounding sewn portion 54 is formed. The position determining portions 55, 56 are formed by holes extending through the fabric portions 43, 44. The position determining portions 55, 56 are located at positions that satisfy the following three conditions.

Condition 1: Each position is close to the corresponding one of the surrounding sewn portions 53, 54.

Condition 2: Each position is located in the margin 57, which is outward of the periphery sewn portion 45.

Condition 3: Each position is farther away from the vent hole 52 in the circumferential direction of the margin 57 than the vent hole defining section 53a, 54a of the corresponding one of the surrounding sewn portions 53, 54.

To satisfy the conditions, the position determining portion 55 is located inside a circle 58 having as a part thereof the surrounding sewn portion 53, and the position determining portion 56 is located inside a circle 59 having as a part thereof the surrounding sewn portion 54.

As described above, the surrounding sewn portions 53, 54 have a small-radius arcuate shape and respectively have the vent hole defining sections 53a, 54a. It is difficult for a worker to form the small-radius surrounding sewn portions 53, 54 with accuracy by operating an ordinary sewing machine. The surrounding sewn portions 53, 54 are therefore formed by a programmable electronic sewing machine. The programmable electronic sewing machine automatically controls operation of a fabric feeding mechanism and a sewing needle drive mechanism according to a sewing program that is required for sewing and has been made in advance based on various conditions for determining a sewing path from a sewing starting point to a sewing finish point.

In contrast, the periphery sewn portion 45, which has a simpler shape than the surrounding sewn portions 53, 54, is formed with an ordinary sewing machine operated by a worker.

Parts of the margin 57 that include parts in which the surrounding sewn portions 53, 54 and the position determining portions 55, 56 are provided are formed to be wider than the remaining part, in which the surrounding sewn portions 53, 54 or the position determining portions 55, 56 are not provided.

As shown in FIG. 3, most of the inflator assembly 30 is accommodated in the rear lower part of the inflation portion 46, so that the lower end of the inflator assembly 30 is exposed to the outside of the airbag 40 through the insertion port 51. The bolts 34 of the retainer 32 are passed through the fabric portion 43 (refer to FIG. 4(a)). This determines the position of the inflator assembly 30 in relation to the airbag 40, while securing the inflator assembly 30.

The airbag module AM is made into a compact storage form by folding the airbag 40 in an uninflated and deployed state (refer to FIG. 3) into a form illustrated, for example, in FIG. 4(a). The airbag module AM is folded in this manner in order that it can be readily accommodated in the storage portion 18 having a limited size in the seat back 14.

The airbag module AM in the storage form is fixed to the side frame portion 15 by inserting the bolts 34 of the retainer 32 through the side frame portion 15 and threading the nuts 35 to the bolts 34.

The retainer 32 may be fixed to the side frame portion 15 using members other than the bolts 34 and the nuts 35.

As shown in FIG. 1, the side airbag apparatus includes an impact sensor 61 and a controller 62 in addition to the above described airbag module AM. The impact sensor 61 is formed by an acceleration sensor and other components and is provided on the body side portion 11 (see FIG. 2) to detect an impact applied from outside of the body side portion 11. The controller 62 controls the operation of the inflator 31 based on a detection signal from the impact sensor 61.

The vehicle 10 is equipped with a seat belt apparatus for restraining the occupant P seated on the vehicle seat 12. However, illustration of the seat belt apparatus is omitted in the drawings, including FIG. 1.

The side airbag apparatus of the first embodiment is constructed as described above. Operation of the side airbag apparatus will now be described.

First, operation for sewing the fabric portions 43, 44 to form the periphery sewn portion 45 and the surrounding sewn portions 53, 54 during manufacture of the airbag 40 will be described.

Initially, as shown in FIG. 7, the fabric portions 43, 44 are overlapped onto each other and set in a programmable electronic sewing machine. At this time, a pin is passed though each of two holes, or the position determining portions 55, 56, formed in the fabric portions 43, 44. The position determining portions 55, 56 determine the positions of the fabric portions 43, 44 on the sewing machine (a secured state). In this state, with reference to the position determining portions 55, 56, the fabric portions 43, 44 are sewn together at positions separated from the position determining portions 55, 56 by predetermined distances to form the surrounding sewn portions 53, 54. Accordingly, the opening 52a of the vent hole 52 is formed with accuracy at a predetermined position in the fabric portions 43, 44.

The pins passed through the position determining portions 55, 56 restrict the fabric portions 43, 44 from shrinking at the parts between the pins when the surrounding sewn portions 53, 54 are formed. This is effective in forming the opening 52a with accuracy.

As shown in FIGS. 8 and 9, since the distances from the position determining portions 55, 56 to the surrounding sewn portions 53, 54 are short, factors that affect the positions of the surrounding sewn portions 53, 54 are unlikely to be present between the position determining portions 55, 56 and the surrounding sewn portions 53, 54 in the fabric portions 43, 44. This also contributes to the accurate positioning of the opening 52a of the vent hole 52.

For the position determining portions 55, 56, the sections inside the circles 58, 59, which include as parts thereof the surrounding sewn portions 53, 54 satisfy the above described conditions 1 to 3. Therefore, forming the surrounding sewn portions 53, 54 with reference to the position determining portions 55, 56 allows the opening 52a of the vent hole 52 to be formed with accuracy.

The fabric portions 43, 44 with the surrounding sewn portions 53, 54 formed thereon are transferred to an ordinary sewing machine. A worker operates the sewing machine to sew the fabric portions 43, 44 along the peripheries, thereby forming the periphery sewn portion 45. At this time, by leaving sections of the peripheries of the fabric portions 43, 44 unsewn, specifically, by leaving front upper regions of the fabric portions 43, 44 unsewn, the periphery sewn portion 45 is provided with a pair of separated terminals 45a, 45b.

Since the sewing is performed such that the terminals 45a, 45b are located in substantially circular areas surrounded by the surrounding sewn portions 53, 54, the completed airbag 40 has the terminals 45a, 45b surrounded by the surrounding sewn portions 53, 54. As long as the terminals 45a, 45b are located in the areas surrounded by the surrounding sewn portions 53, 54, the positional accuracy of the terminals 45a, 45b are not required to be high. This is because the vent hole defining sections 53a, 54a of the surrounding sewn portions 53, 54 are respectively closer to the opening 52a of the vent hole 52 than the terminals 45a, 45b of the periphery sewn portion 45. That is, the terminals 45a, 45b of the periphery sewn portion 45 are not used for forming the opening 52a of the vent hole 52. Therefore, the positions of the terminals 45a, 45b of the periphery sewn portion 45 are not required to have a high accuracy, which facilitates sewing of the periphery sewn portion 45 performed by a worker.

Next, operation of the side airbag apparatus having the airbag 40, in which the surrounding sewn portions 53, 54 and the periphery sewn portion 45 are formed in the above described manner, will be described.

In the side airbag apparatus, when no impact is applied to the body side portion 11 of the vehicle 10, the controller 62 sends no activation signal to the inflator 31, so that the inflator 31 does not supply inflation gas to the inflation portion 46 of the airbag 40. The airbag 40 thus remains stored in the storage portion 18 in the storage form with the inflator assembly 30 (see FIG. 4($a$)). In this state, the fabric portions 43, 44 continues contacting or to be close to each other in the vent hole 52, so that the vent hole 52 continues being closed as shown in FIG. 10($a$).

In contrast, when the impact sensor 61 detects that an impact of a magnitude greater than or equal to a predetermined value has been applied to the body side portion 11 due to a side collision or the like while the vehicle is running, the controller 62, based on the detection signal, sends an activation signal to the inflator 31 to activate the inflator 31. In response to the activation signal, the gas generating agent in the inflator 31 generates and ejects inflation gas G. The ejected inflation gas is supplied to the inflation portion 46 via the retainer 32.

When supplied with inflation gas, the inflation portion 46 is inflated so that the airbag 40 is unfolded. As shown in FIG. 4($b$), the airbag 40 is projected forward from the seat back 14 with the rear portion thereof and the inflator assembly 30 remaining in the storage portion 18. Thereafter, inflation gas is continuously supplied to the airbag 40 so that the airbag 40 is deployed and inflated forward in a space between the body side portion 11 of the vehicle and the occupant P seated on the vehicle seat 12, as indicated by broken lines in which a long dash alternates with a pair of short dashes in FIG. 2. When the airbag 40 is deployed and inflated, the terminals 45a, 45b of the periphery sewn portion 45 and the surrounding sewn portions 53, 54 are separated forward from the seat back 14. The airbag 40 is thus located between the occupant P and the body side portion 11, which is bulging into the passenger compartment.

When the body side portion 11 bulges further into the passenger compartment, the airbag 40 is pressed against the occupant P in the vehicle width direction, thereby restraining the occupant P.

In addition, parts of the fabric portions 43, 44 that surround the vent hole 52 are deformed into a tubular shape. Accordingly, the vent hole 52 shifts from the closed state to an open state. At this time, since the parts of the fabric portions 43, 44 are located at positions separated forward from the seat back 14, the deformation of these parts is unlikely to hindered by the components of the seat back 14. Further, the surrounding sewn portions 53, 54 are formed in and about the margin 57, which is located in the middle of the airbag 40 in the vehicle widthwise direction when the airbag 40 is deployed and inflated. Thus, the parts of the fabric portions 43, 44 that surround the vent hole 52 are unlikely to be deformed by the body side portion 11.

Excess inflation gas G in the inflation portion 46 is discharged forward and upward of the airbag 40 via the vent hole 52 having an open tubular shape. At this time, the auxiliary sewn sections 53d, 54d are not likely to hinder the flow of the inflation gas G through the vent hole 52. This is because the auxiliary sewn sections 53d, 54d are reversed from the terminals 53f, 54f of the surrounding sewn portions 53, 54 and extend into the regions surrounded by the surrounding sewn portions 53, 54, that is, the auxiliary sewn sections 53d, 54d extend in a direction away from the vent hole 52.

When discharged through the vent hole 52, some of the inflation gas in the inflation portion 46 directly strikes the inner curved sections 53b, 54b of the surrounding sewn portions 53, 54 before passing through the opening 52a of the vent hole 52. If the inner curved sections 53b, 54b have angular parts, the stress of the inflation gas may be concentered on the angular parts. However, according to the first embodiment, the stress of the inflation gas is received by the inner curved sections 53b, 54b, which are relatively large arcuate areas with smooth curves. As a result, the stress is unlikely to be concentrated on particular parts of the inner curved sections 53b, 54b.

The inflation gas that strikes the inner curved sections 53b, 54b of the surrounding sewn portions 53, 54 flows along them to be smoothly guided to the opening 52a of the vent hole 52.

When discharged through the vent hole 52, some of the inflation gas in the inflation portion 46 directly strikes the outer curved sections 53c, 54c of the surrounding sewn portions 53, 54 after passing through the opening 52a of the vent hole 52. If the outer curved sections 53c, 54c have angular parts, the stress of the inflation gas may be concentered on the angular part. However, according to the first embodiment, the stress of the inflation gas is received by the outer curved sections 53c, 54c, which are relatively large arcuate areas with smooth curves. As a result, the stress is unlikely to be concentrated on particular parts of the outer curved sections 53c, 54c.

The inflation gas that strikes the outer curved sections 53c, 54c of the surrounding sewn portions 53, 54 flows along them to be smoothly discharged from the vent hole 52.

When the inflation gas in the inflation portion 46 is discharged through the vent hole 52 in the open state, the stress of the inflation gas acts on the terminals 53f, 54f of the surrounding sewn portions 53, 54, which are close to the vent hole 52. If the terminals 53f, 54f are the ends of sewing, the acting stress may cause the surrounding sewn portions 53, 54 to fray inward from the terminals 53f, 54f.

In this regard, the auxiliary sewn sections 53d, 54d extend from the terminals 53f, 54f in the first embodiment, and the distal ends of the auxiliary sewn sections 53d, 54d are the actual terminals, or the ends of sewing, of the surrounding sewn portions 53, 54. The auxiliary sewn sections 53d, 54d extend in a direction away from the vent hole 52, and the distal ends of the auxiliary sewn sections 53d, 54d are farther from the vent hole 52 than the terminals 53f, 54f. Therefore, the stress of the inflation gas when it is discharged from the vent hole 52 is unlikely to be applied to the distal ends of the auxiliary sewn sections 53d, 54d.

Further, since the distal ends of the auxiliary sewn sections 53d, 54d are closer to the center of the inflation portion 46 than the straight line L1, which connects the terminals 53f, 54f of the surrounding sewn portions 53, 53, the stress of the inflation gas when being discharged from the vent hole 52 is less likely to be applied to the distal ends of the auxiliary sewn sections 53d, 54d.

Particularly, in the first embodiment, the surrounding sewn portions 53, 54 are respectively located between the distal ends of the auxiliary sewn sections 53d, 54d and the vent hole 52. Therefore, although the stress of the inflation gas when it is discharged from the vent hole 52 is applied to the surrounding sewn portions 53, 54, the stress is unlikely to be applied to the extended ends of the auxiliary sewn sections 53d, 54d.

Further, since the auxiliary sewn sections 53d, 54d are respectively formed to be close to the surrounding sewn portions 53, 54, the auxiliary sewn sections 53d, 54d function to reinforce the terminals 53f, 54f of the surrounding sewn portions 53, 54 and the outer curved sections 53c, 54c. This improves the durability of the terminals 53f, 54f of the surrounding sewn portions 53, 54 and the outer curved sections 53c, 54c.

Moreover, since the position determining portions 55, 56 are formed in the margin 57, which is located outward of the inflation portion 46, and separated from the inflation portion 46, the inflation gas in the inflation portion 46 is unlikely to leak from the position determining portions 55, 56.

Further, since the position determining portions 55, 56 are respectively arranged to be farther way from the vent hole 52 in the circumferential direction of the margin 57 than the vent hole defining sections 53a, 54a of the surrounding sewn portions 53, 54, the position determining portions 55, 56 are unlikely to affect the gas discharge capability of the vent hole 52.

The restraint of the occupant P by the airbag 40 and the drop of the internal pressure of the inflation portion 46 due to discharge of the inflation gas G reduce the impact transmitted to the occupant P through the body side portion 11.

The first embodiment as described above has the following advantages.

(1) The periphery sewn portion 45 has the terminals 45a, 45b, which are separated from each other, and the fabric portions 43, 44 are sewn together such that the terminals 45a, 45b are surrounded by the surrounding sewn portions 53, 54. The opening 52a of the vent hole 52 is defined by the vent hole defining sections 53a, 54a, which are parts of the surrounding sewn portions 53, 54 that face each other and are closest to each other. The position determining portions 55, 56 are respectively located close to the surrounding sewn portions 53, 54 and formed in the margin 57. The position determining portions 55, 56 are also respectively farther from the vent hole 52 in the circumferential direction of the margin 57 than the vent hole defining sections 53a, 54a of the surrounding sewn portions 53, 54. In other words, the position determining portions 55, 56 are respectively farther from the opening 52a of the vent hole 52 than the vent hole defining sections 53a, 54a of the surrounding sewn portion 53, 54 (see FIG. 7).

Therefore, with reference to the position determining portions 55, 56, the surrounding sewn portions 53, 54, which have the vent hole defining sections 53a, 54a, are formed at predetermined positions in the fabric portions 43, 44, so that the opening 52a of the vent hole 52 is formed with accuracy. As a result, the vent hole 52 is provided with a desired gas discharge capability.

(2) The inner curved sections 53b, 54b, which are parts of the surrounding sewn portions 53, 54 that extend from the vent hole defining sections 53a, 54a toward the center of the inflation portion 46, have a smooth curved shape (see FIGS. 8 and 9).

Therefore, even if the inflation gas in the inflation portion 46 strikes the inner curved sections 53b, 54b of the surrounding sewn portions 53, 54 before passing through the opening 52a of the vent hole 52, the stress of the inflation gas is restricted from being concentrated on a particular part of the inner curved sections 53b, 54b.

(3) The outer curved sections 53c, 54c, which are parts of the surrounding sewn portions 53, 54 that extend from the vent hole defining sections 53a, 54a away from the center of the inflation portion 46, have a smooth curved shape (see FIGS. 8 and 9).

Therefore, even if the inflation gas in the inflation portion 46 strikes the outer curved sections 53b, 54b of the surrounding sewn portions 53, 54 after passing through the opening 52a of the vent hole 52, the stress of the inflation gas is restricted from being concentrated on particular parts of the outer curved sections 53c, 54c.

(4) The terminals 53f, 54f of the surrounding sewn portions 53, 54 have the auxiliary sewn sections 53d, 54d, which extend in a direction away from the vent hole 52 (see FIGS. 8 and 9).

Therefore, the actual ends, or the ends of sewing, of the surrounding sewn portions 53, 54 are not the terminals 53f, 54f, but the distal ends of the auxiliary sewn sections 53d, 54d. When the inflation gas in the inflation portion 46 is discharged from the vent hole 52, the stress of the inflation gas is unlikely to be applied to the distal ends of the auxiliary sewn sections 53d, 54d, and the distal ends of the auxiliary sewn sections 53d, 54d are restricted from fraying. This allows the surrounding sewn portions 53, 54 to easily maintain the initial shapes without being damaged.

Further, the auxiliary sewn sections 53d, 54d have structures that do not hinder discharge of inflation gas from the vent hole 52.

(5) The auxiliary sewn sections 53d, 54d are closer to the center of the inflation portion 46 than the straight line L1, which connects the terminals 53f, 54f of the surrounding sewn portions 53, 54 (FIGS. 8 and 9).

Since the distal ends of the auxiliary sewn sections 53d, 54d are respectively located on the opposite sides of the surrounding sewn portions 53, 54 from the vent hole 52, the stress of the inflation gas being discharged from the vent hole 52 is further unlikely to act on the distal ends of the auxiliary sewn sections 53d, 54d. This effectively suppresses fraying that starts from the distal ends of the auxiliary sewn sections 53d, 54d.

(6) The auxiliary sewn sections 53d, 54d are reversed toward the vent hole defining sections 53a, 54a in a region surrounded by the surrounding sewn portions 53, 54 (see FIG. 7).

Since the surrounding sewn portions 53, 54 are respectively located between the distal ends of the auxiliary sewn sections 53d, 54d and the vent hole 52, the stress of the inflation gas being discharged from the vent hole 52 is further unlikely to act on the distal ends of the auxiliary sewn sections 53d, 54d. This also effectively suppresses fraying that starts from the distal ends of the auxiliary sewn sections 53d, 54d.

Further, since the auxiliary sewn sections 53d, 54d are respectively formed to be close to the surrounding sewn portions 53, 54, the auxiliary sewn sections 53d, 54d reinforce the terminals 53f, 54f of the surrounding sewn portions 53, 54 and the outer curved sections 53c, 54c so that the durability thereof is improved.

(7) The position determining portions 55, 56 are respectively located inside the circles 58, 59, which have as parts thereof the surrounding sewn portions 53, 54 (see FIG. 7).

Therefore, with reference to the position determining portions 55, 56, the surrounding sewn portions 53, 54, which have the vent hole defining sections 53a, 54a, are formed, so that the opening 52a of the vent hole 52 is formed with accuracy.

Having arcuate shapes, the surrounding sewn portions 53, 54 are easier to sew than a case where they are partially straight.

(8) The position determining portions 55, 56 are formed to extend through the fabric portions 43, 44, so that pins of a sewing machine can be passed therethrough (see FIG. 7).

Thus, by inserting the pins of the sewing machine through the position determining portions 55, 56, the positions of the fabric portions 43, 44 are determined at the position determining portions 55, 56 on the sewing machine (secured state). Therefore, forming the surrounding sewn portions 53, 54 with reference to the position determining portions 55, 56 in this state allows the opening 52a of the vent hole 52 to be formed with accuracy.

Second Embodiment

A vehicle side airbag apparatus according to a second embodiment of the present invention will now be described with reference to FIGS. 11 and 17. The differences from the first embodiment will mainly be discussed. Like or the same reference numerals are given to those components that are like or the same as the corresponding components described above in the first embodiment and detailed explanations are omitted.

Figure 12:
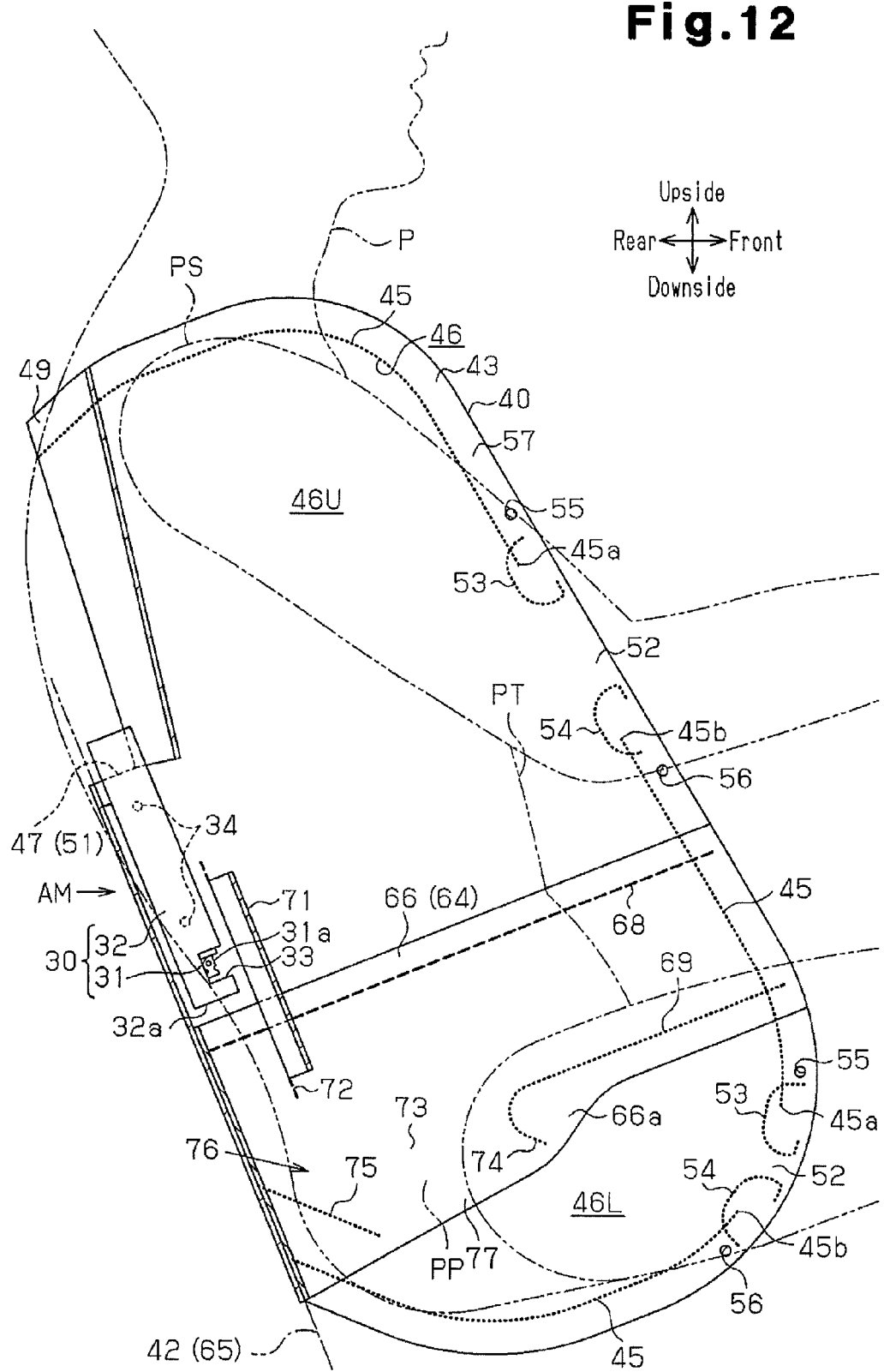
FIG. 12 is a partial cross-sectional side view showing the internal structure of the airbag module shown in FIG. 11, together with an occupant.

As shown in FIGS. 11 and 12, at least the lower end of the retainer 32 of the inflator assembly 30 is formed as an open end 32a. The retainer 32 has a window 33 at a position substantially in front of a gas outlet 31a of the inflator 31. A considerable amount of inflation gas discharged through the gas outlet 31a is delivered substantially downward and forward of the retainer 32 through the open end 32a and the window 33.

The shape and size of the fabric portions 43, 44 of the airbag 40 are set to be able to occupy the region corresponding to most part of the upper body of the occupant P (the section from a lumbar region PP to a shoulder region PS) when the airbag 40 is deployed and inflated between the vehicle seat 12 and the body side portion 11.

As in the first embodiment, the above described joining of the fabric portions 43, 44 is achieved by the periphery sewn portion 45 provided in a peripheral portion of the fabric portions 43, 44. Likewise, joining of an outside joint portion 68, an inside joint portion 69, a side edge joint portion 72, and peripheral joint portions 74, 75, which are discussed below, are achieved by sewing.

Three types of lines represent sewing portions in FIGS. 11 to 15 and 18. The first type of line includes thick lines with a certain length arranged intermittently (a kind of broken line), and represents sewn portions as viewed from the side (refer to the periphery sewn portion 45 in FIG. 11) as in the first embodiment. The second type of line includes thin lines with a certain length (longer than a typical broken line) arranged intermittently (a kind of broken line), and represents the sewing threads that are located behind the outer side fabric portion 44 and cannot be seen directly (refer to an inside joint portion 69 in FIG. 11). The third type of line includes dots arranged at predetermined intervals (a kind of a broken line), and represents the sewing thread at the position between the fabric portions 43, 44, which are the target of sewing, and between structural fabric portions 66, 67 (see the periphery sewn portion 45 in FIG. 12). That is, the drawings in which the sewn part is represented by the third type of line show the structure along the cross-section that passes through the sewn portion.

Figures 13, 14:
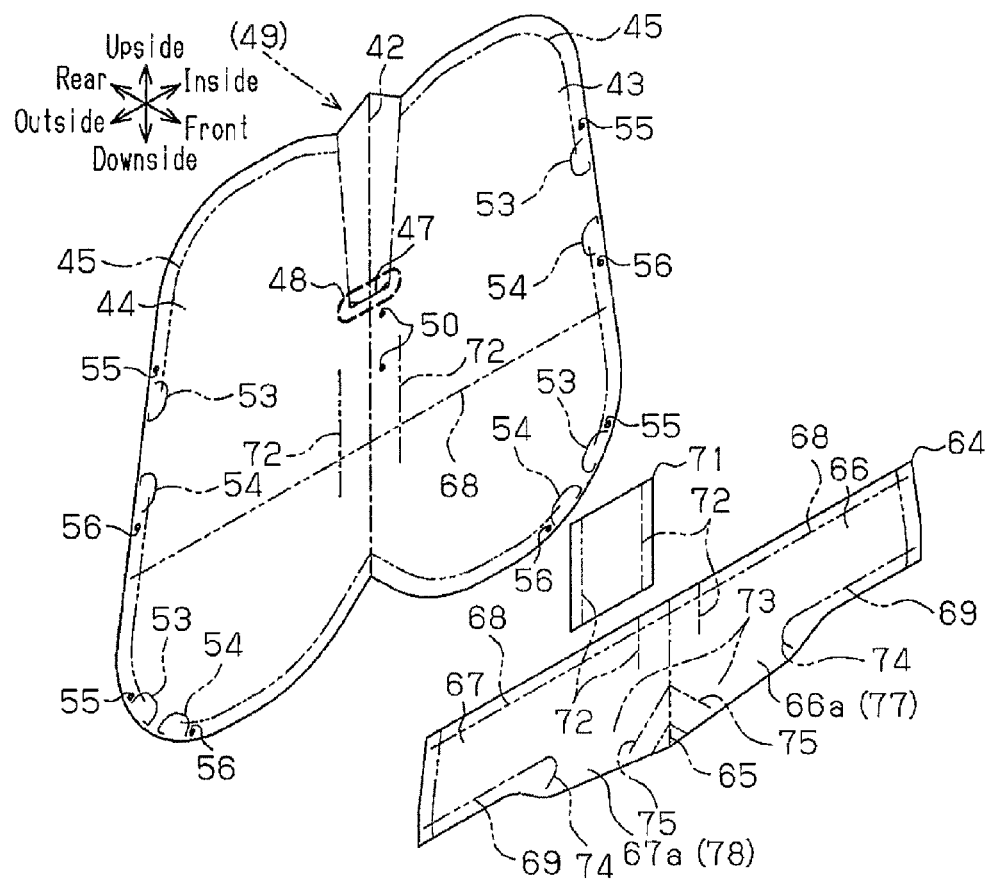
FIG. 13 is an exploded perspective view of the second embodiment, illustrating an airbag, an inner tube, and a lateral partition.
FIG. 14 is an enlarged partial side view illustrating region Y of FIG. 11.

As shown in FIG. 13, the inner side fabric portion 43 has bolt holes 50 (the number of which is two in the present embodiment), which are located in the vicinity of the folding line 42 and below the slit 47. The bolts 34 of the retainer 32 (see FIG. 4(a)) are passed through the bolt holes 50.

As shown in FIG. 12, the inflation portion 46 is divided into an upper inflation portion 46U, which is deployed and inflated beside the thorax PT of the occupant P, and a lower inflation portion 46L, which is deployed and inflated beside the lumbar region PP. The lateral partition 64 has the same structure as a component generally referred to as a tether.

As shown in FIGS. 12 and 13, the lateral partition 64 is formed by folding a single fabric piece, which is made of the same material as the airbag 40, along a folding line 65 set at the center portion to be overlapped in the vehicle widthwise direction, and installing the overlapped portions to extend between lower parts of the fabric portions 43, 44. The lower parts of the fabric portions 43, 44 are parts corresponding to the boundary between the lumbar region PP and the thorax PT of the occupant P. The lateral partition 64 may also be formed of two fabric pieces divided along the folding line 65.

To distinguish the two overlapped parts of the lateral partition 64, the part located on the inner side is referred to as a structural fabric portion 66, and the part located on the outer side is referred to a structural fabric portion 67. The inner side structural fabric portion 66 has, in its rear half, a bulging portion 66a, which bulges downward when the lateral partition 64 is folded in half. Likewise, the outer side structural fabric portion 67 has, in its rear half, a bulging portion 67a, which bulges downward.

Figure 16:
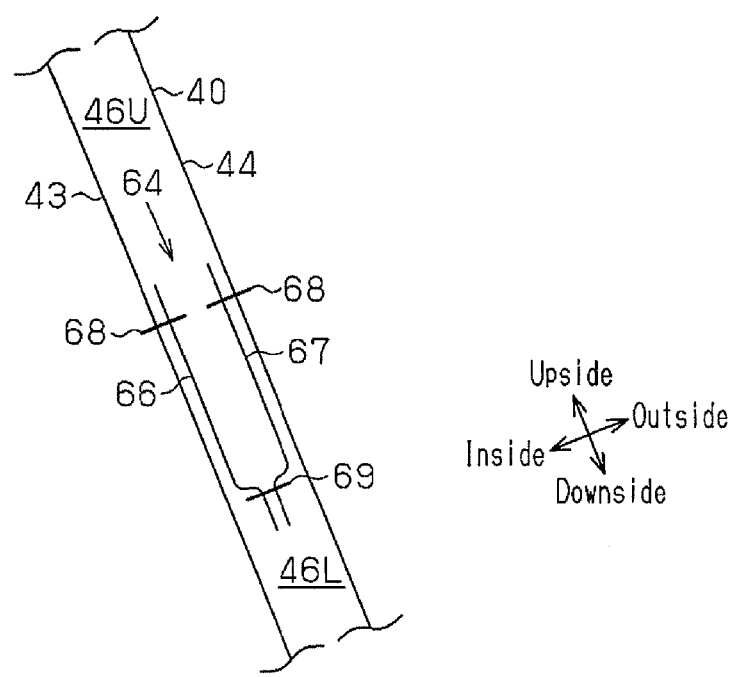
FIG. 16 is a cross-sectional view taken along line 16-16 in FIG. 11.
Figure 17:
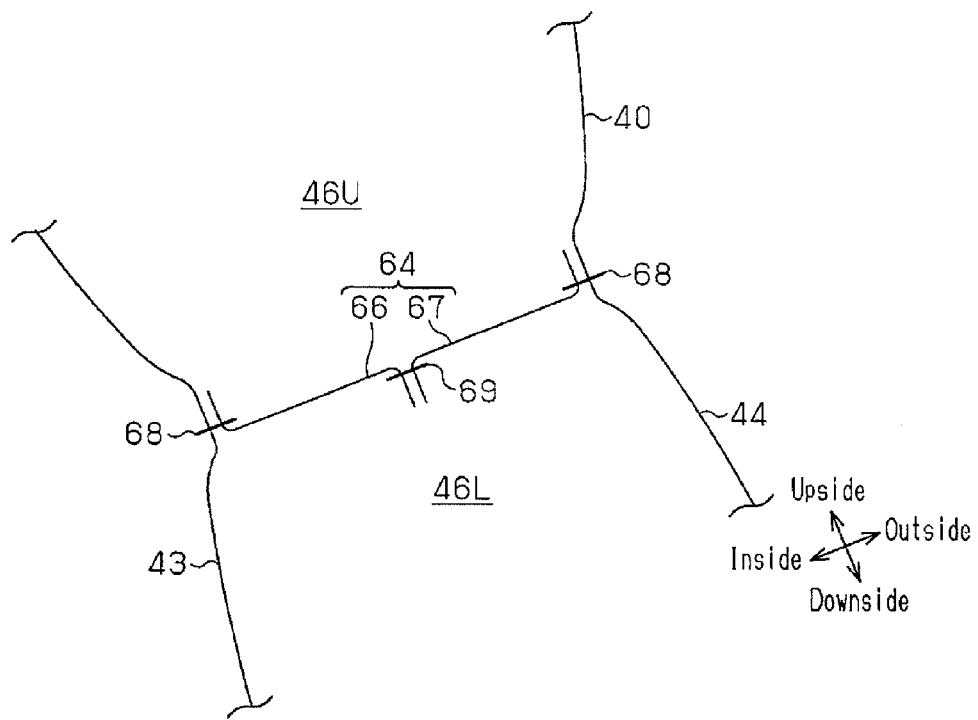
FIG. 17 is a partial cross-sectional view illustrating a state inside the airbag when the lateral partition of FIG. 16 is tensed as the airbag is inflated.

The lateral partition 64, which is folded in half as described above, is located between the fabric portions 43, 44 with the folding line 65 matched with the folding line 42 of the airbag 40 (see FIGS. 16 and 17). The inner side structural fabric portion 66 has an outside joint portion 68 formed along the upper peripheral portion. The inner side structural fabric portion 66 is joined to the inner side fabric portion 43 by the outside joint portion 68. Likewise, the outer side structural fabric portion 67 has an outside joint portion 68 formed along the upper peripheral portion. The outer side structural fabric portion 67 is joined to the outer side fabric portion 44 by the outside joint portion 68. The structural fabric portions 67, 66 are joined to each other by an inside joint portion 69 located at the lower peripheral portion. Further, the front ends of the structural fabric portions 66, 67 are joined to (sewn together with) the front ends of the fabric portions 43, 44 by the periphery sewn portion 45, which is described above. When the inflation portion 46 is deployed and inflated, the lateral partition 64 is tensed in the vehicle widthwise direction to limit the thickness of the inflation portion 46 in the same direction (see FIG. 17).

An inner tube 71 is arranged in the rear end of the airbag 40 folded in half and below the insertion port 51. The inner tube 71 regulates the flow of the inflation gas discharged by the inflator 31 such that a greater amount of the discharged gas is supplied to the lower inflation portion 46L than to the upper inflation portion 46U. In other words, the inner tube 71 regulates the flow of the inflation gas to supply the inflation gas preferentially to the lower inflation portion 46L. An upper part and a middle part of the inner tube 71 are overlapped onto the fabric portions 43, 44, and a lower part of the inner tube 71 is overlapped onto the upper part of the lateral partition 64. To form the inner tube 71, a single fabric piece that is made of the same material as the airbag 40 is used.

The inner tube 71 is joined the airbag 40 and the lateral partition 64 by side edge joint portion 72 provided at both sides in the vehicle widthwise direction. Accordingly, the inner tube 71 extends between the fabric portions 43, 44 of the airbag 40 and between the structural fabric portions 66, 67 of the lateral partition 64. Thus, the inner tube 71 and the fabric portions 43, 44 surround a lower part of the inflator assembly 30, which extends substantially vertically. The upper part of the inflator assembly 30 extends through insertion port 51 to be exposed to the outside of the airbag 40. The bolts 34 of the retainer 32 are passed through the bolt holes 50. The insertion of the bolts 34 secures the inflator assembly 30 to the airbag 40 in a state where the position is determined with respect the airbag 40. In this state, the gas outlet 31a is located at a position that is rearward of the upper inflation portion 46U. The gas outlet 31a is also located above and in the vicinity of the lower inflation portion 46L.

The lateral partition 64 also has an opening 73 and a check valve 76. The opening 73 is adapted for connecting the lower inflation portion 46L and the upper inflation portion 46U to each other. More specifically, the inside joint portion 69 in the lateral partition 64 is disjoined in rear parts of the structural fabric portions 66, 67. In other words, the inside joint portion 69, which joins the structural fabric portions 66, 67 to each other, is absent in an area including the folding line 65. In this manner, a part where the inside joint portion 69 is not provided forms the opening 73.

The check valve 76 is configured to restrict the flow of inflation gas at the opening 73. That is, the check valve 76 allows inflation gas to flow from the upper inflation portion 46U to the lower inflation portion 46L, but restricts the flow in the opposite direction. More specifically, front peripheral parts of the folded bulging portions 66a, 67a are joined to each other by the peripheral joint portion 74 formed along the peripheral parts. The upper end of the peripheral joint portion 74 is connected to the rear end of the inside joint portion 69. Rear parts of the folded bulging portions 66a, 67a are joined to each other by the peripheral joint portion 75 formed along the rear peripheral portions. The peripheral joint portions 74, 75 are both inclined to be lowered toward the front ends. Further, parts of the folded bulging portions 66a, 67a that are rearward of the peripheral joint portion 75 are joined to (sewn together with) the rear lower ends of the fabric portions 43, 44 by the periphery sewn portion 45. A part of the inner side bulging portion 66a that is surrounded by the opening 73 and the peripheral joint portions 74, 75 forms an inner side valve body 77 of the check valve 76. Likewise, a part of the outer side bulging portion 67a that is surrounded by the opening 73 and the peripheral joint portions 74, 75 forms an outer side valve body 78 of the check valve 76.

The check valve 76 allows flow of inflation gas when one of the valve bodies 77, 78 is separated from the other. This state of the check valve 76 is referred to as a valve opening state. The check valve 76 blocks flow of inflation gas when the valve bodies 77, 78 contact each other in at least parts thereof. This state of the check valve 76 is referred to as a valve closing state.

Figure 15:
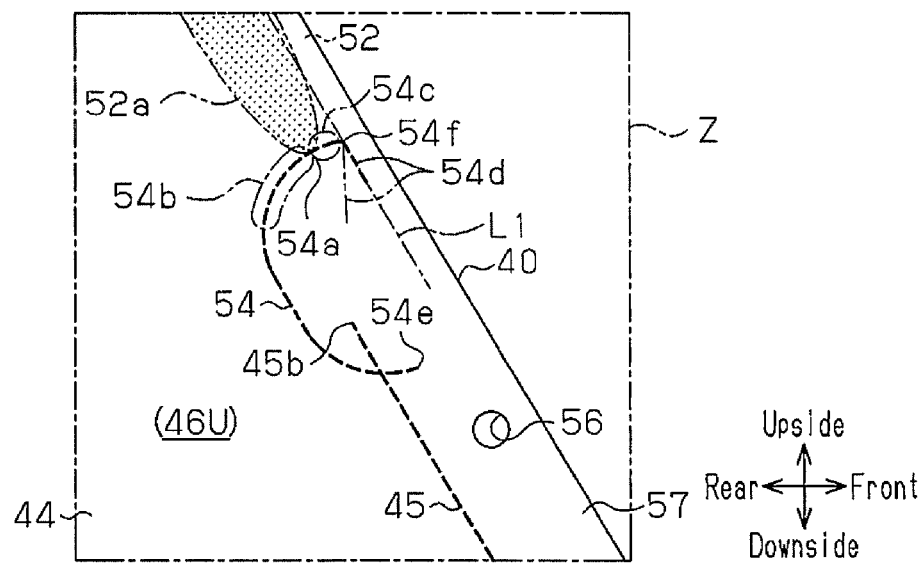
FIG. 15 is an enlarged partial side view illustrating region Z of FIG. 11.

As shown in FIGS. 11, 14, and 15, the airbag 40 has a vent hole 52 for discharging excess discharge gas in the upper inflation portion 46 and another vent hole for discharging excess discharge gas in the lower inflation portion 46L. The structures for forming the vent holes 52 are the same. Therefore, hereinafter, the structure for forming the vent hole 52 for the upper inflation portion 46U will be described, and description of the structure for forming the vent hole 52 for the lower inflation portion 46L will be omitted.

As in the first embodiment, the structure for forming the vent hole 52 includes the surrounding sewn portions 53, 54 and the position determining portions 55, 56. The structure is different from the vent hole forming structure according to the first embodiment in the following points.

The main parts of the surrounding sewn portions 53, 54 are each formed by a part of an oval. An oval herein refers to a shape formed by dividing a circle into halves along a dividing line including the circle center, separating the halves in an axis perpendicular to the dividing line, and then connecting the ends of the circle halves with two straight lines.

The main part of each surrounding sewn portion 53 includes terminals 53e, 53f, which are separated from each other. The open parts of the surrounding sewn portions 53 defined by the terminals 53e, 53f respectively face in the directions opposite from the center of the upper inflation portion 46U and the lower inflation portion 46L. The main part of each surrounding sewn portion 54 includes terminals 54e, 54f, which are separated from each other. The open parts of the surrounding sewn portions 54 defined by the terminals 54e, 54f respectively face in the direction opposite from the center of the upper inflation portion 46U and the lower inflation portion 46L. Therefore, sections 53b, 54b of the surrounding sewn portions 53, 54 that respectively extend from the vent hole defining sections 53a, 54a toward the center of the upper inflation portion 46U and the center of the lower inflation portion 46L have a smooth curved shape. As in the first embodiment, the inner curved sections 53b, 54b of the surrounding sewn portions 53, 54 respectively have an arcuate shape that curves at a constant radius of curvature to be gradually separated from the surrounding sewn portions 54, 53 as the distances from the center of the upper inflation portion 46U and the center of the lower inflation portion 46L decrease. Further, sections 53c, 54c of the surrounding sewn portions 53, 54 that respectively extend from the vent hole defining sections 53a, 54a and away from the center of the upper inflation portion 46U and the center of the lower inflation portion 46L have a smooth curved shape. As in the first embodiment, the outer curved sections 53c, 54c of the surrounding sewn portions 53, 54 have an arcuate shape that curves at a constant radius of curvature (the same radius or curvature of the inner curved sections 53b, 54b) to be gradually separated from the surrounding sewn portions 54, 53 as the distance from the center of the upper inflation portion 46U or the lower inflation portion 46L increases. The length of the outer curved sections 53c, 54c is shorter than that in the first embodiment.

The terminals 53f, 54f of the surrounding sewn portions 53, 54, which are closer to the vent hole 52, are arranged in the margin 57, and are located between the terminals 45a, 45b of the periphery sewn portion 45. The terminal 53f, 54f have auxiliary sewn sections 53d, 54d, which extend from the terminals 53f, 54f in a direction away from the vent hole 52. As indicated by a thick broken line in FIGS. 14 and 15, the auxiliary sewn sections 53d, 54d are formed on a straight line L1 connecting the terminals 53f, 54f.

The terminals 53e, 54e of the surrounding sewn portions 53, 54, which are farther from the vent hole 52, are arranged in the margin 57, and are located farther from the vent hole 52 than the terminals 45a, 45b of the periphery sewn portion 45.

To satisfy the above described conditions 1 to 3, the position determining portions 55, 56 are located outside the oval having as a part the surrounding sewn portions 53, 54 and farther from the vent hole 52 than the oval. The position determining portions 55, 56 are respectively located inward of the terminals 53f, 54f of the surrounding sewn portions 53, 54.

As described above, the outer curved sections 53c, 54c of the surrounding sewn portions 53, 54 are shorter than that in the first embodiment, and the position determining portions 55, 56 are located inward of the terminals 53f, 54f. Thus, parts of the margin 57 that include parts in which the surrounding sewn portions 53, 54 and the position determining portions 55, 56 are formed to be narrower than the those in the first embodiment, and are as wide as the remaining part, in which the surrounding sewn portions 53, 54 or the position determining portions 55, 56 are not formed.

The side airbag apparatus of the second embodiment is constructed as described above. Operation of the side airbag apparatus will now be described.

During manufacture of the airbag 40, operation for sewing the fabric portions 43, 44 to form the periphery sewn portion 45 and the surrounding sewn portions 53, 54 are performed in the same manner as the first embodiment. That is, pins of a programmable electronic sewing machine are passed though the position determining portions 55, 56 of the fabric portions 43, 44, so that the fabric portions 43, 44 are sewn to positions that are separated away from the position determining portions 55, 56 by a predetermined distance. This forms a pair of surrounding sewn portions 53, 54. A worker operates an ordinary sewing machine to sew the fabric portions 43, 44 along the peripheries, thereby forming the periphery sewn portion 45.

When inflation gas is discharged by the gas outlet 31a of the inflator 31, for example, in response to a side collision during traveling of the vehicle, some of the inflation gas flows substantially forward via the window 33 of the retainer 32, which is shown in FIG. 12, and then strikes the inner tube 71. This changes the direction of the flow to substantially upward and downward directions. The inflation gas the direction of which has been changed to substantially upward direction flows into the upper inflation portion 46U via the upper opening of the inner tube 71. The inflation gas thus starts inflating the upper inflation portion 46U.

The inflation gas discharged from the lower open end 32a of the retainer 32 and the inflation gas the direction of which has been changed to a substantially downward direction by the inner tube 71 flow toward the check valve 76. As described above, the amount of inflation gas that flows toward the lower inflation portion 46L via the check valve 76 is greater than the amount of inflation gas that flows toward the upper inflation portion 46U.

During the period in which inflation gas is being supplied to the check valve 76, a force that deforms the valve bodies 77, 78 into a tubular shape is generated. Thus, the inflation gas flows into the lower inflation portion 46L after sequentially passing through the opening 73 and the space between the valve bodies 77, 78. The inflow of the inflation gas starts inflating the lower inflation portion 46L. The lateral partition 64 is pulled in the vehicle widthwise direction by the fabric portions 43, 44, which are being inflated.

The continuous supply of inflation gas from the inflator 31 increases the internal pressure of the upper inflation portion 46U and the lower inflation portion 46L, which unfolds (deploys) these inflation portions 46U, 46L in the reverse order of the folding order. Then, the seat pad 16 of the seat back 14 is pushed by the upper inflation portion 46U and the lower inflation portion 46L and breaks at the breakable portion 21 (see FIG. 4(a)). Then, the upper inflation portion 46U and the lower inflation portion 46L are projected forward from the seat back 14 through the broken portion with a part thereof remaining in the storage portion 18.

Subsequently, the upper inflation portion 46U and the lower inflation portion 46L, which continue being supplied with inflation gas, are deployed while being unfolded substantially forward between the body side portion 11 and the upper body of the occupant P seated in the vehicle seat 12 as indicated by broken lines in which a long dash alternates with a pair of short dashes in FIG. 2. As shown in FIG. 12, the lower inflation portion 46L, the internal pressure of which is higher than that of the upper inflation portion 46U, is deployed and inflated beside the lumbar region PP. The upper inflation portion 46U, the internal pressure of which is lower than that of the lower inflation portion 46L, is deployed and inflated beside the shoulder region PS and the thorax PT.

As shown in FIG. 17, the lateral partition 64 is tensed by being pulled in the vehicle widthwise direction. The lateral partition 64 in such a tensed state limits the thickness of the inflated upper and lower inflation portions 46U, 46L in the vehicle widthwise direction.

The airbag 40, in which the upper and lower inflation portions 46U, 46L are each deployed and inflated, is located between the upper body of the occupant P and the inwardly bulging body side portion 11. The airbag 40 pushes the upper body of the occupant P inward of the vehicle and restrains the upper body.

As shown in FIG. 12, when the discharge of inflation gas from the inflator 31 stops and the inflation gas in the lower inflation portion 46L acts to flow to the upper inflation portion 46U, the valve bodies 77, 78 of the check valve 76 are pushed by the high pressure in the lower inflation portion 46L and contact each other. As a result, the check valve 76 is closed, and the inflation gas in the lower inflation portion 46L is restricted from flowing out (back) to the upper inflation portion 46U through the space between the valve bodies 78, 78 and the opening 73.

Thereafter, while allowing inflation gas to flow from the upper inflation portion 46U to the lower inflation portion 46L, the check valve 76 restricts the inflation gas in the lower inflation portion 46L from flowing out (back) to the upper inflation portion 46U. Therefore, if, for example, the internal pressure of the lower inflation portion 46L is increased as the side airbag apparatus restrains the lumbar region PP of the occupant P, the check valve 76 restricts the inflation gas in the lower inflation portion 46L from flowing out to the upper inflation portion 46U. Thus, the internal pressure of the upper inflation portion 46U is unlikely to be increased under the influence of pressure fluctuation in the lower inflation portion 46L that accompanies the restraint of the lumbar region PP.

As shown in FIG. 10(b), parts of the fabric portions 43, 44 about the vent hole 52 change to a tubular shape during restraint of the occupant P by the airbag 40, so that the vent hole 52 is open. Excess inflation gas in the upper inflation portion 46U and the lower inflation portion 46L is discharged substantially forward of the airbag 40 via the vent hole 52. At this time, as shown in FIGS. 14 and 15, the auxiliary sewn sections 53d, 54d, which extend from the terminals 53f, 54f of the surrounding sewn portions 53, 54 and in a direction away from the vent hole 52 are not likely to hinder the flow of the inflation gas through the vent hole 52.

Even if the inflation gas in the inflation portion 46 directly strikes the inner curved sections 53b, 54b of the surrounding sewn portions 53, 54 before passing through the opening 52a of the vent hole 52 in the open state, the stress of the inflation gas is unlikely to be concentrated on a particular part of the inner curved sections 53b, 54b because the inner curved sections 53b, 54b are arcuate areas with smooth curves. Further, the inflation gas that strikes the inner curved sections 53b, 54b flows along them to be smoothly guided to the opening 52a of the vent hole 52.

In contrast, even if the inflation gas in the inflation portion 46 directly strikes the outer curved sections 53c, 54c of the surrounding sewn portions 53, 54 after passing through the opening 52a when being discharged from the vent hole 52 in the open state, the stress of the inflation gas is unlikely to be concentrated on particular parts of the outer curved sections 53c, 54c because the outer curved sections 53c, 54c are arcuate areas with smooth curves. The inflation gas that strikes the outer curved sections 53c, 54c flows along them to be smoothly discharged from the vent hole 52.

Further, when the inflation gas in the inflation portion 46 is discharged through the vent hole 52 in the open state, the stress of the inflation gas is applied to the terminals 53f, 54f of the surrounding sewn portions 53, 54. The auxiliary sewn sections 53d, 54d extend from the terminals 53f, 54f in the second embodiment, and the distal ends of the auxiliary sewn sections 53d, 54d are the actual terminals, or the ends of sewing, of the surrounding sewn portions 53, 54. The distal ends of the auxiliary sewn sections 53d, 54d, which are located on the straight line L1 connecting the terminals 53f, 54f are located on the opposite side of the surrounding sewn portions 53, 54 from the vent hole 52. Therefore, the stress of the inflation gas when it is discharged from the vent hole 52 is unlikely to be applied to the distal ends of the auxiliary sewn sections 53d, 54d.

Moreover, since the position determining portions 55, 56 are formed in the margin 57 located outward of the upper inflation portion 46U and the lower inflation portion 46L and separated from the upper and lower inflation portions 46U, 46L, the inflation gas in the upper and lower inflation portions 46U, 46L is unlikely to leak from the position determining portions 55, 56.

Further, since the position determining portions 55, 56 are respectively located outside the oval having as a part thereof the surrounding sewn portions 53, 54 and farther from the vent hole 52 than the oval, the position determining portions 55, 56 are unlikely to affect the gas discharge capability of the vent hole 52.

Thus, the second embodiment has the following advantages in addition to the above described advantages (1) to (4), and (8).

(9) The auxiliary sewn sections 53d, 54d are formed on the straight line L1, which connects the terminals 53f, 54f of the surrounding sewn portions 53, 54 (FIGS. 14 and 15).

Therefore, as in the case of the advantage of the above item (5), when the inflation gas in the upper inflation portion 46U and the inflation gas in the lower inflation portion 46L are discharged from the vent hole 52, the stress of the inflation gas is unlikely to be transmitted to the distal ends of the auxiliary sewn sections 53d, 54d, which are the actual terminals of the surrounding sewn portions 53, 54. This effectively suppresses fraying that starts from the distal ends of the auxiliary sewn sections 53d, 54d.

Further, the auxiliary sewn sections 53d, 54d according to the second embodiment are easier to form by sewing compared to those in the first embodiment, which are reversed toward the vent hole defining sections 53a, 54a. This is because, after the outer curved sections 53c, 54c are formed, the direction of sewing does not need to be changed significantly to form the auxiliary sewn sections 53d, 54d. In addition, no sewing is required at positions close to the outer curved sections 53c, 54c.

(10) The lengths of the outer curved sections 53c, 54c of the surrounding sewn portions 53, 54 are respectively shorter than those in the first embodiment, and the position determining portions 55, 56 are located inward of the terminals 53f, 54f of the surrounding sewn portions 53, 54 (see FIGS. 14 and 15).

Therefore, the parts of the margin 57 that are close to the parts in which the surrounding sewn portions 53, 54 and the position determining portions 55, 56 are formed can be formed to be narrower than those in the first embodiment.

The above embodiments may be modified as follows.

<Regarding Periphery Sewn Portion 45>

The terminals 45a, 45b of the periphery sewn portion 45 may be provided at positions different from those in the above described embodiments. In the first embodiment, the terminals 45a, 45b may be provided, for example, in an upper part, a middle part, or a front lower part of the periphery sewn portion 45.

Like the surrounding sewn portions 53, 54, the periphery sewn portion 45 may be formed by a programmable electronic sewing machine.

The periphery sewn portion 45 may be formed by sewing peripheries of three or more fabric portions.

<Regarding Surrounding Sewn Portions 53, 54>

The surrounding sewn portions 53, 54 of the first embodiment may have arcuate shapes with central angles θ1, θ2 less than 180°.

In the first and second embodiments, the shapes of the surrounding sewn portions 53, 54 are not limited to arcuate, but may be annular, if sewing is possible. However, in this case, since the surrounding sewn portions 53, 54 are enlarged outward, the margin 57 needs to be formed to have a greater width, accordingly.

In the first and second embodiments, the inner curved sections 53b, 54b of the surrounding sewn portions 53, 54 do not necessarily need to be arcuate as long as the inner curved sections 53b, 54b have smoothly curved shapes. Further, the inner curved sections 53b, 54b do not necessarily need to be formed by a single curved part, but may be formed by two or more curved parts.

In the first and second embodiments, the outer curved sections 53c, 54c of the surrounding sewn portions 53, 54 do not necessarily need to be arcuate as long as the outer curved sections 53c, 54c have smoothly curved shapes. Further, the outer curved sections 53c, 54c do not necessarily need to be formed by a single curved part, but may be formed by two or more curved parts.

Figure 18:
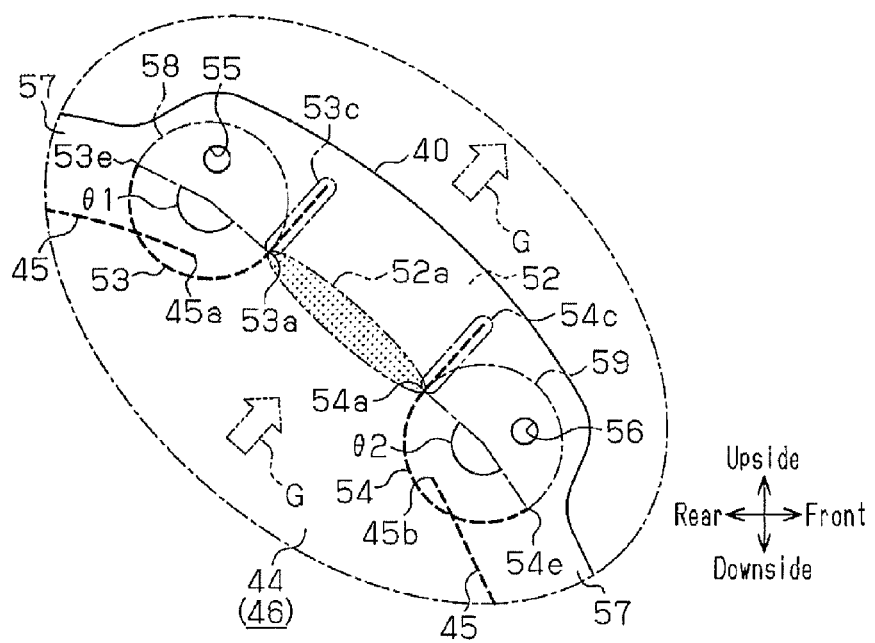
FIG. 18 is a partial side view corresponding to FIG. 7, illustrating a modification to the surrounding sewn portion of the first embodiment.
Figure 19:
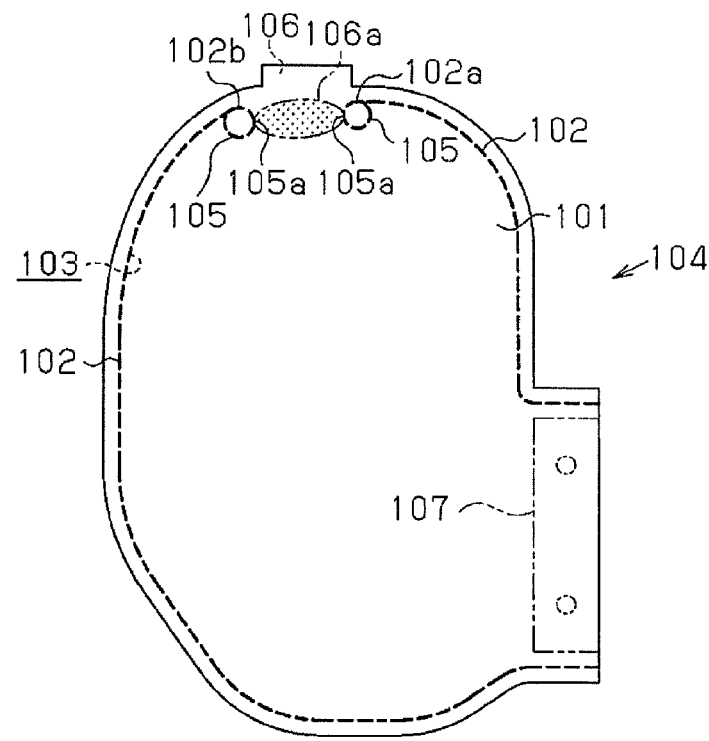
FIG. 19 is a side view illustrating a conventional airbag apparatus.
Figure 20:
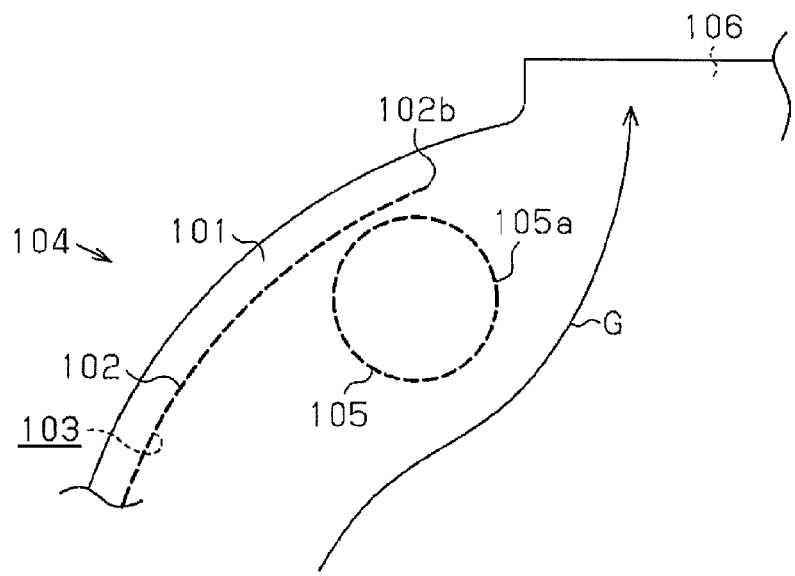
FIG. 20 is an enlarged partial side view illustrating the airbag of FIG. 19.

As a modification to the first embodiment, as shown in FIG. 18, the outer curved sections 53c, 54c of the surrounding sewn portions 53, 54 may be formed to extend in straight lines so that the distance from the outer curved sections 53c, 54c facing the surrounding sewn portions 53, 54 are constant.

However, in this case, a part that is between the fabric portions 43, 44 and between the outer curved sections 53c, 54c directly affects the discharge capability of the vent hole 52. It is therefore preferable the surrounding sewn portions 53, 54 be sewn with accuracy such that the outer curved sections 53c, 54c are parallel with each other.

In the first and second embodiments, the greater the size of the surrounding sewn portions 53, 54 (specifically, the diameter in the first embodiment and the minor axis in the second embodiment), the easier the sewing becomes and the wider the margin 57 needs to be. Accordingly, the size of the airbag 40 is increased. In contrast, if the size of the surrounding sewn portions 53, 54 is reduced, the width of the margin 57 can be reduced, but it becomes difficult to form the surrounding sewn portions 53, 54 to have smooth arcuate shapes through sewing. Further, if the inner curved sections 53b, 54b or the outer curved sections 53c, 54c of the surrounding sewn portions 53, 54 are changed to have non-arcuate shapes, stress is likely to be concentrated. The size of the surrounding sewn portions 53, 54 are preferably determined taking into consideration these advantages and drawbacks.

In the first and second embodiments, the advantage of accurate forming of the opening 52a of the vent hole 52 is achieved by forming the surrounding sewn portions 53, 54 with reference to the position determining portions 55, 56. The terminals 45a, 45b of the periphery sewn portion 45 do not directly contribute in achieving the advantage. Therefore, in a case where sewing of the periphery sewn portion 45 does not required to be significantly facilitated, for example, when the periphery sewn portion 45 is formed by the programmable electronic sewing machine, the surrounding sewn portions 53, 54 may be formed after the periphery sewn portion 45 is formed.

<Regarding Auxiliary Sewn Sections 53d, 54d>

In a case where the surrounding sewn portions 53, 54 have a sufficiently high durability, the auxiliary sewn sections 53d, 54d may be omitted.

In the first and second embodiments, the terminals 53e, 54e of the surrounding sewn portions 53, 54 may have auxiliary sewn sections like the auxiliary sewn sections 53d, 54d of the terminals 53f, 54f. In this case, the auxiliary sewn sections of the terminals 53e, 54e may be formed either inside or outside the areas surrounded by the surrounding sewn portions 53, 54.

However, forming auxiliary sewn sections in the terminals 53e, 54e is of lower importance than forming the auxiliary sewn sections 53d, 54d in the terminals 53f, 54f. This is because, if the terminals 53e, 54e fray in a case where the terminals 53e, 54e do not have any auxiliary sewn section, there is a possibility that the fraying does not progress beyond the intersections between the surrounding sewn portions 53, 54 and the periphery sewn portion 45. Therefore, in a case where the terminals 53e, 54e have auxiliary sewn sections, it is preferable that the terminals 53f, 54f have the auxiliary sewn sections 53d, 54d.

The auxiliary sewn sections 53d, 54d of the second embodiment may be closer to the center of the inflation portion 46 than the straight line L1, which connects the terminals 53f, 54f, as indicated by lines formed by a long dash alternating with two short dashes in FIGS. 14 and 15. In this case also, as in the case where the auxiliary sewn sections 53d, 54d are formed on the straight line L1, the stress of the inflation gas being discharged from the vent hole 52 is unlikely to act on the distal ends of the auxiliary sewn sections 53d, 54d.

In the first and second embodiments, the terminals 53f, 54f of the surrounding sewn portions 53, 54 may be at the same positions as the vent hole defining sections 53a, 54a. In this case, auxiliary sewn sections 53d, 54d may be formed to extend from the vent hole defining sections 53a, 54a.

<Regarding Position Determining Portions 55, 56>

The shapes and sizes of the holes forming the position determining portions 55, 56 may be different from those in the first and second embodiments.

In the first and second embodiments, the position determining portions 55, 56 may have any form other than holes as long as the position determining portions 55, 56 can be used as references when the surrounding sewn portions 53, 54 are formed.

<Regarding Inflator Assembly 30>

In the first and second embodiments, the side airbag apparatus may be configured such that the inflator assembly 30 is entirely accommodated in the airbag 40. Conversely, the inflator assembly 30 may be entirely outside of the airbag 40.

<Regarding Storage Portion 18>

In the first and second embodiments, instead of the seat back 14 of the vehicle seat 12, a storage portion may be located in the body side portion 11 to accommodate the airbag module AM.

<Other Modifications>

In the second embodiment, the outside joint portion 68, the inside joint portion 69, the side edge joint portion 72, the peripheral joint portions 74, 75 may be formed by method other than sewing using sewing threads, but may be formed by, for example, using an adhesive.

The present invention may be applied to an airbag apparatus in which the inflation portion is divided into three or more sections.

The present invention may be applied to a side airbag apparatus that protects a part of the upper body of an occupant other than the protected part in the first embodiment (the thorax PT). For example, the present invention may be applied to a side airbag apparatus that protects any of the lumbar region, the abdomen, the shoulder region, and the head.

The present invention may be applied to a side airbag apparatus that protects a combination of any of the lumbar region, the abdomen, the shoulder region, and the head of an occupant, different from the combination to be protected in the second embodiment (the part including the shoulder region and the lumbar region).

The present invention may be applied to a vehicle seat that faces in a direction other than the forward direction, for example, in a vehicle seat that faces sideways. In this case, when an impact is applied to a side of the vehicle seat (in the front-rear direction of the vehicle), the side airbag apparatus protects an occupant from the impact.

Other than side airbag apparatuses, the present invention may be applied to any type of airbag apparatus that inflates an airbag at a position close to an occupant of a vehicle to restrain the occupant and a vent hole is formed in a part of a periphery sewn portion. One example such airbag apparatuses is a curtain shield airbag apparatus. A curtain shield airbag apparatus has an airbag stored in a part of the roof near a side door. In response to an impact from the outer side of the vehicle due to a side collision, the airbag is deployed and inflated between the head of an occupant and the door window.

Vehicles to which the airbag apparatus according to the present invention is applied include various industrial vehicles in addition to private automobiles.

The present invention may be applied not only to the airbag apparatus installed in a seat of vehicles, but also to airbag apparatuses installed in a seat of other transportation such as aircrafts and ships.

The invention claimed is:

1. An airbag apparatus comprising an airbag that is formed into a bag shape by sewing a plurality of fabric portions together at peripheries thereof, wherein the airbag includes:
 a periphery sewn portion formed by the sewing;
 a margin located outward of the periphery sewn portion; and
 an inflation portion surrounded by the periphery sewn portion, wherein
 the inflation portion is adapted to be inflated by being supplied with inflation gas and has a center,
 the periphery sewn portion has two terminals separated from each other, and the terminals are formed by leaving sections of the peripheries of the fabric portions unsewn,
 the airbag further includes:
 a pair of surrounding sewn portions, each of which is formed by sewing parts of the fabric portions that surround one of the terminals of the periphery sewn portion;
 a vent hole located between the terminals of the periphery sewn portion, wherein the vent hole has an opening that allows inflation gas from inside the inflation portion to be discharged, and the opening is defined by vent hole defining sections, each of which is located in one of the surrounding sewn portions, the vent hole defining sections facing each other and being closest to each other; and
 a pair of position determining portions, each of which is located close to one of the surrounding sewn portions, wherein
 each of the surrounding sewn portions is formed in place with reference to the corresponding position determining portion, and
 the position determining portions are each formed in the margin and farther away from the vent hole in a circumferential direction of the margin than the vent hole defining section of the corresponding surrounding sewn portion.

2. The airbag apparatus according to claim 1, wherein a section of each surrounding sewn portion that extends from the vent hole defining section toward the center of the inflation portion has a smooth curved shape.

3. The airbag apparatus according to claim 2, wherein a section of each surrounding sewn portion that extends from the vent hole defining section in a direction opposite from the center of the inflation portion has a smooth curved shape.

4. The airbag apparatus according to claim 3, wherein
 each surrounding sewn portion has two terminals separated from each other, and the two terminals define an open part of the surrounding sewn portion, the open part facing in a direction opposite from the center of the inflation portion, and
 one of the terminals of each surrounding sewn portion that is close to the vent hole has an auxiliary sewn section, which extends from the terminal in a direction away from the vent hole.

5. The airbag apparatus according to claim 4, wherein, when a straight line is defined that connects a terminal of one of the surrounding sewn portions that is close to the vent hole and a terminal of the other surrounding sewn portion that is close to the vent hole, each auxiliary sewn section is located either on the straight line or at a position closer to the center of the inflation portion than the straight line.

6. The airbag apparatus according to claim 5, wherein each auxiliary sewn section is a reversed section that extends toward the vent hole defining section of the corresponding surrounding sewn portion by being arranged in an area surrounded by the surrounding sewn portion.

7. The airbag apparatus according to claim 1, wherein a section of each surrounding sewn portion that extends from the vent hole defining section in a direction opposite from the center of the inflation portion has a smooth curved shape.

8. The airbag apparatus according to claim 1, wherein
 each surrounding sewn portion has two terminals separated from each other, and the two terminals define an open part of the surrounding sewn portion, the open part facing in a direction opposite from the center of the inflation portion, and
 one of the terminals of each surrounding sewn portion that is close to the vent hole has an auxiliary sewn section, which extends from the terminal in a direction away from the vent hole.

9. The airbag apparatus according to claim 8, wherein, when a straight line is defined that connects a terminal of one of the surrounding sewn portions that is close to the vent hole and a terminal of the other surrounding sewn portion that is close to the vent hole, each auxiliary sewn section is located either on the straight line or at a position closer to the center of the inflation portion than the straight line.

10. The airbag apparatus according to claim 9, wherein each auxiliary sewn section is a reversed section that extends toward the vent hole defining section of the corresponding surrounding sewn portion by being arranged in an area surrounded by the surrounding sewn portion.

11. The airbag apparatus according to claim 1, wherein
 each surrounding sewn portion has an arcuate shape and has two terminals separated from each other, and the two terminals define an open part of the surrounding sewn portion, the open part facing in a direction opposite from the center of the inflation portion, and each position determining portion is located inside a circle that has as a part thereof the corresponding surrounding sewn portions.

* * * * *